(12) United States Patent
Wada et al.

(10) Patent No.: US 6,243,254 B1
(45) Date of Patent: Jun. 5, 2001

(54) DIELECTRIC CERAMIC COMPOSITION AND LAMINATED CERAMIC CAPACITOR USING THE SAME

(75) Inventors: Nobuyuki Wada, Shiga-ken; Masamitsu Shibata, Kyoto; Takashi Hiramatsu, Shiga-ken; Yukio Hamaji, Otsu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/369,988

(22) Filed: Aug. 6, 1999

(30) Foreign Application Priority Data

Aug. 11, 1998 (JP) .................................................. 10-227202
Aug. 11, 1998 (JP) .................................................. 10-227203

(51) Int. Cl.$^7$ ...................................................... H01G 4/06
(52) U.S. Cl. .................. 361/311; 361/321.2; 361/321.5; 501/134
(58) Field of Search ............................. 361/321.1, 321.2, 361/321.3, 321.4, 321.5, 322, 311–313; 501/134–139

(56) References Cited

U.S. PATENT DOCUMENTS

| 5,036,424 | * | 7/1991 | Yokotani et al. | ................. | 361/321.4 |
| 5,801,111 | * | 9/1998 | Wada et al. | ........................... | 501/138 |
| 6,051,516 | * | 4/2000 | Mizuno et al. | ....................... | 501/138 |

FOREIGN PATENT DOCUMENTS

0893419A1    1/1999  (EP) .
2264297A     8/1993  (GB) .

* cited by examiner

Primary Examiner—Anthony Dinkins
(74) Attorney, Agent, or Firm—Ostrolenk, Faber, Gerb & Soffen, LLP

(57) ABSTRACT

Provided is a highly reliable laminated ceramic capacitor in which decrease of dielectric constant under a high electric field is small and which satisfies the B-grade and X7R grade characteristics, using Ni for the inner electrodes, wherein the dielectric material contains about 0.2 to 5.0 parts by weight of $Li_2O$—(Si, Ti)$_2$—MO oxides (MO is at least one of the compounds of $Al_2O_3$ and $ZrO_2$) or $SiO_2$—$TiO_2$—XO oxides (XO is at least one of the compounds of BaO, CaO, SrO, MgO, ZnO and MnO) relative to 100 parts by weight of a principal component represented by $(Ba_{1-x}Ca_xO)_mTiO_2 + \alpha Re_2O_3 + \beta MgO + \gamma MnO$ ($Re_2O_3$ represents at least one of $Y_2O_3$, $Gd_2O_3$, $Tb_2O_3$, $Dy_2O_3$, $Ho_2O_3$, $Er_2O_3$ and $Yb_2O_3$).

20 Claims, 5 Drawing Sheets

DIELECTRIC CERAMIC COMPOSITION AND LAMINATED CERAMIC CAPACITOR USING THE SAME

BACKGROUND OF THE INVENTION

1. Field of the Invention

The present invention relates to a dielectric ceramic composition and a laminated ceramic capacitor using the same, especially to a ceramic capacitor having inner electrodes made of Ni.

2. Description of the Related Art

Ceramic layers and inner electrode metal layers are alternately stacked in the laminated ceramic capacitor. A cheap base metal such as Ni has been recently used for the inner electrodes in place of expensive noble metals such as Ag and Pd for reducing the production cost. When Ni is used for the electrodes, the capacitor should be fired in a reducing atmosphere where Ni is not oxidized. However, ceramics comprising barium titanate as a principal component may be endowed with semiconductive properties when the ceramics are fired in a reducing atmosphere. Accordingly, as disclosed for example in Japanese Examined Patent Publication No. 57-42588, a dielectric material in which the ratio between the barium site and titanium site in the barium titanate solid solution is adjusted to be larger than the stoichiometric ratio has been developed. This allows the laminated ceramic capacitor using Ni as electrodes to be practically used, thereby expanding its production scale.

Since electronic parts have been rapidly miniaturized with the recent advance of electronics, small size ceramic capacitors with large capacitance as well as temperature stability of electrostatic capacitance are required. The ceramic capacitors having the Ni electrodes are also under the same circumstances.

For complying with the requirements of large capacitance and small size, the dielectric ceramics should be made to be thinner and multi-layered. However, much higher voltage is impressed on the dielectric material when the dielectric ceramic layer is thinned, often causing troubles such as decrease of dielectric constant, increase of temperature dependency of the electrostatic capacitance and deteriorated stability of other characteristics when conventional dielectric materials are used. Especially, when the thickness of the dielectric layer is reduced to 5 $\mu$m or less, 10 or less ceramic particles are contained between the inner electrodes, making it difficult to assure a stable quality.

Making the dielectric layer thin is accompanied by other problems. Solder plating layers as external electrodes are usually formed on the baked electrodes of a conductive metal powder in order to comply with automatic packaging of the laminated ceramic capacitor. Therefore, the plating layer is generally formed by electroplating. Oxides containing boron or a glass is added, on the other hand, into some dielectric ceramics as a sintering aid. However, the dielectric ceramic using these additives has so poor resistance against plating that characteristics of the laminated ceramic capacitor may be deteriorated by dipping it into a plating solution. It has been a problem that reliability is markedly decreased in the ceramic capacitor having thin dielectric ceramic layers.

SUMMARY OF THE INVENTION

Accordingly, the object of the present invention is to provide a laminated ceramic capacitor with high reliability and large capacitance especially using Ni for inner electrodes, wherein dielectric constant is not decreased exhibiting a stable electrostatic capacitance even when the dielectric ceramic layers are thinned, and temperature characteristics of the electrostatic capacitance satisfy the B-grade characteristics prescribed in the JIS standard and the X7R-grade characteristics prescribed in the EIA standard.

The present invention also provides a highly reliable laminated ceramic capacitor with large capacitance made of thin dielectric ceramic layers having an excellent plating solution resistance.

In one aspect, the present invention provides a laminated ceramic capacitor provided with a plurality of dielectric ceramic layers, inner electrodes formed between the dielectric ceramic layers and external electrodes being in electrical continuity with the inner electrodes, the dielectric ceramic layer being represented by the following formula:

$(Ba_{1-x}Ca_xO)_m TiO_2 + \alpha Re_2O_3 + \beta MgO + \gamma MnO$ ($Re_2O_3$ is at least one or more of the compounds selected from $Y_2O_3$, $Gd_2O_3$, $Tb_2O_3$, $Dy_2O_3$, $Ho_2O_3$, $Er_2O_3$ and $Yb_2O_3$, $\alpha, \beta, \gamma$, m and x representing molar ratio in the range of $0.001 \leq \alpha \leq 0.10$, $0.001 \leq \beta \leq 0.12$, $0.001 < \gamma \leq 0.12$, $1.000 < m \leq 1.035$ and $0.005 < x \leq 0.22$), and containing about 0.2 to 5.0 parts by weight of either a first sub-component or a second sub-component relative to 100 parts by weight of a principal component containing about 0.02% by weight or less of alkali-metal oxides in $(Ba_{1-x}Ca_xO)_m TiO_2$ as a starting material to be used for the dielectric ceramic layer, wherein the first sub-component is a $Li_2O$—$(Si,Ti)O_2$—MO based oxide (MO is at least one of the compound selected from $Al_2O_3$ and $ZrO_2$) and the second sub-component is a $SiO_2$—$TiO_2$—XO based oxide (XO is at least one of the compound selected from BaO, CaO, SrO, MgO, ZnO and MnO). The inner electrodes are preferably composed of nickel or a nickel alloy.

The material $(Ba_{1-x}Ca_xO)_m TiO_2$ to be used for the dielectric ceramic layer preferably has a mean particle size of about 0.1 to 0.7 $\mu$m.

The first sub-component represented by $xLiO_2$—$y(Si_wTi_{1-w})O_2$—zMO (x, y and z are represented by molar percentage (mol %) and w is in the range of $0.30 \leq w \leq 1.0$) may be within the area surrounded by the straight lines connecting between the succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0) or on the lines in a ternary composition diagram having apexes represented by each component $LiO_2$, $(Si_wTi_{1-w})O_2$ and MO provided that when the component is on the line A–F, w is in the range of $0.3 \leq w \leq 1.0$.

The second sub-component represented by $xSiO_2$—$yTiO_2$—zXO (x, y and z are represented by mol %) may be within the area surrounded by the straight lines connecting between the succeeding two points represented by A (x=85, y=1, z=14), B (x=35, y=51, z=14), C (x=30, y=20, z=50) and D (x=39, y=1, z=60) or on the lines in a ternary composition diagram having apexes represented by each component $SiO_2$, $TiO_2$ and XO.

At least one of the compounds $Al_2O_3$ and $ZrO_2$ are contained with a combined amount of about 15 parts by weight ($ZrO_2$ is about 5 parts by weight or less) in the second sub-component relative to 100 parts by weight of the $SiO_2$—$TiO_2$—XO based oxide.

The external electrodes are composed of sintered layers of a conductive metal powder or a conductive metal powder supplemented with a glass frit.

Alternately, the external electrodes are composed of sintered layers of a conductive metal powder or a conductive metal powder supplemented with a glass frit, and plating layers formed thereon.

It is preferable to use the ceramic having the composition to be described hereinafter in order to improve the plating resistance. The dielectric ceramic layer in the laminated ceramic capacitor is represented by the following formula:

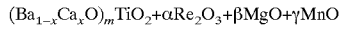
$(Ba_{1-x}Ca_xO)_mTiO_2+\alpha Re_2O_3+\beta MgO+\gamma MnO$ ($Re_2O_3$ is at least one or more of the compounds selected from $Y_2O_3$, $Gd_2O_3$, $Tb_2O_3$, $Dy_2O_3$, $Ho_2O_3$, $Er_2O_3$ and $Yb_2O_3$, $\alpha$, $\beta$ $\gamma$, m and x representing molar ratio in the range of $0.001\alpha \leq 0.10$, $0.001 \leq \beta 0.12$, $0.001 < \gamma \leq 0.12$, $1.000 < m \leq 1.035$ and $0.005 < x \leq 0.22$), and contains about 0.2 to 5.0 parts by weight of the compound selected from either a first sub-component, a second sub-component or a third sub-component relative to 100 parts by weight of a principal component containing about 0.02% by weight or less of alkali-metal oxides in $(Ba_{1-x}Ca_xO)_mTiO_2$ as a starting material to be used for the dielectric ceramic layers, wherein the first sub-component is a $Li_2O$—$B_2O_3$—$(Si, Ti)O_2$ based oxide, the second sub-component is a $Al_2O_3$—MO—$B_2O_3$ based oxide (MO is at least one of the compound selected from BaO, CaO, SrO, MgO, ZnO and MnO) and the third sub-component is $SiO_2$.

The first sub-component represented by $xLiO_2$—$YB_2O_3$—$Z(Si_wTi_{1-w})O_2$ (x, y and z are represented by mol % and w is in the range of $0.30 \leq w \leq 1.0$) is preferably within the area surrounded by the straight lines connecting between the succeeding two points represented by A (x=0, y=20, z=80), B (x=19, y=1, z=80), C (x=49, y=1, z=50), D (x=45, y=50, z=5), E (x=20, y=75, z=5) and F (x=0, y=80, z=20) or on the lines in a ternary composition diagram having apexes represented by each component $LiO_2$, $B_2O_3$ and $(Si_wTi_{1-w})O_2$.

At least one of the compounds $Al_2O_3$ and $ZrO_2$ are contained in a combined amount of about 20 parts by weight or less ($ZrO_2$ is about 10 parts by weight or less) in the first sub-component relative to 100 parts by weight of the $Li_2O$—$B_2O_3$—$(Si, Ti)O_2$ based oxide.

The second sub-component represented by $xAl_2O_3$—$yMO$—$zB_2O_3$ (x, y and z are represented by mol %) is preferably within the area surrounded by the straight lines connecting between the succeeding two points represented by A (x=1, y=14, z=85), B (x=20, y=10, z=70), C (x=30, y=20, z=50), D (x=40, y=50, z=10), E (x=20, y=70, z=10) and F (x=1, y=39, z=60) or on the lines in a ternary composition diagram having apexes represented by each component $Al_2O_3$, yMO and $zB_2O_3$.

DESCRIPTION OF THE PREFERRED EMBODIMENT

The laminated ceramic capacitor according to the present invention will now be explained in more detail with reference to the accompanying drawings.

Figure 1:
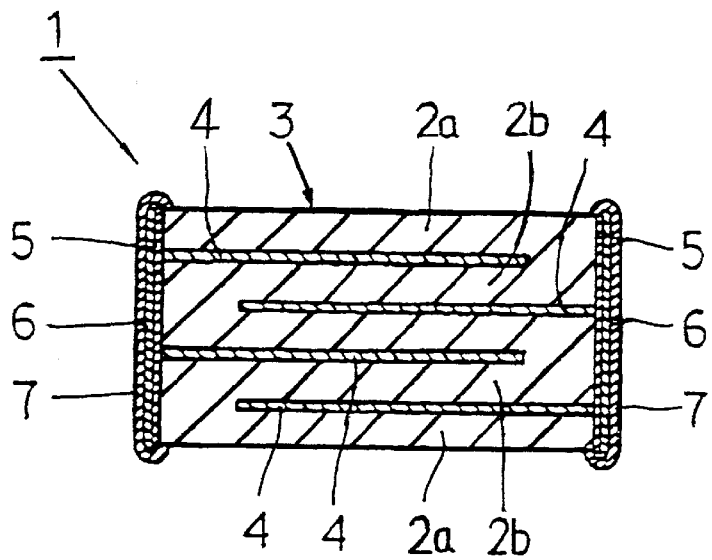
FIG. 1 is a cross section showing one example of the laminated ceramic capacitor according to the present invention.
Figure 2:
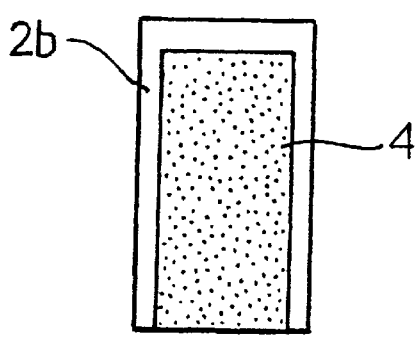
FIG. 2 is a plane view showing the dielectric ceramic layer part having the inner electrodes in the laminated ceramic capacitor shown in FIG. 1.
Figure 3:
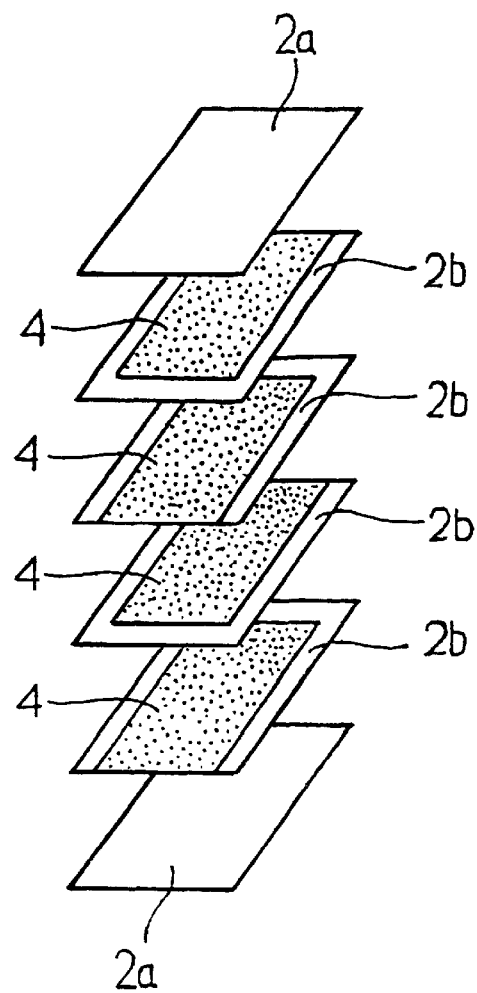
FIG. 3 is a disassembled perspective view showing the laminated ceramic part in the laminated ceramic capacitor shown in FIG. 1.

FIG. 1 is a cross section showing one example of the laminated ceramic capacitor according to the present invention, FIG. 2 is a plane view showing the dielectric ceramic layer part having the inner electrodes in the laminated ceramic capacitor shown in FIG. 1 and FIG. 3 is a disassembled perspective view showing the laminated ceramic part in the laminated ceramic capacitor shown in FIG. 1. In the laminated ceramic capacitor 1 according to the present invention as shown in FIG. 1, outer electrodes 5, and first plating layers 6 and second plating layers 7 if necessary, are formed on both ends of a ceramic laminated body 3 obtained by laminating a plurality of dielectric ceramic layers 2a and 2b via inner electrodes 4.

The dielectric ceramic layers 2a and 2b are composed of a dielectric ceramic composition having as principal components barium calcium titanate $(Ba_{1-x}Ca_xO)_mTiO_2$, at least one compound selected from $Y_2O_3$, $Gd_2O_3$, $Tb_2O_3$, $Dy_2O_3$, $Ho_2O_3$, $Er_2O_3$ and $Yb_2O_3$, MgO and MnO, and containing as sub-components either a $Li_2O$—$(Si, Ti)O_2$—MnO based oxide (MO is at least one of the compounds selected from $Al_2O_3$ and $ZrO_2$) or a $SiO_2$—$TiO_2$—XO based oxide (XO is at least one of the compounds selected from BaO, CaO, SrO, MgO, ZnO and Mno). The composition described above allows a laminated ceramic capacitor with high reliability and excellent insulating strength to be obtained, wherein the ceramic capacitor can be fired without endowing it with semiconductive properties even by firing in a reducing atmosphere, the temperature characteristics of the electrostatic capacitance satisfy the B-grade characteristics prescribed in the JIS standard and the X7R-grade characteristics prescribed in the EIA standard and the ceramic capacitor has a high insulation resistance at room temperature and at high temperatures.

Also, a highly reliable laminated ceramic capacitor, whose dielectric constant is less affected by variation of electric field even when the dielectric ceramic layers are thinned and magnetic field strength is increased, can be obtained by using a barium calcium titanate material with a mean particle size of about 0.1 to 0.7 μm. The dielectric ceramic assumes a core-shell structure in which Re components (Re is at least one or more of the elements selected from Y, Gd, Tb, Dy, Ho, Er and Yb) are distributed in the vicinity of and at grain boundaries by diffusion during firing.

A highly reliable dielectric material can be also obtained by using a barium calcium titanate containing about 0.02% by weight or less of alkali metal oxides such as $Na_2O$ and $K_2O$.

The ratio (n) of (barium+calcium)/titanium in the barium calcium titanate material is not specifically limited. However, the ratio (n) in the range from about 0.990 to 1.035 is desirable when stability for producing powder materials is taken into consideration.

$Li_2O$—$(Si, Ti)O_2$—MO based oxides contained in the principal components described above serve for firing the dielectric ceramics at a relatively low temperature of 1250° C., improving high temperatures load characteristics. $SiO_2$—$TiO_2$—XO based oxides included in the principal components also allow the sintering property to be excellent along with improving the voltage load characteristics at a high temperature and humidity. Further, a higher insulation resistance can be obtained by allowing $Al_2O_3$ and $ZrO_2$ to be contained in the $SiO_2$—$TiO_2$—XO based oxides.

The inner electrode 4 is composed of base metals such as nickel or a nickel alloy.

The outer electrode 5 is composed of a sintered layer of various conductive metals such as Ag, Pd, Ag—Pd, Cu or a Cu alloy, or a sintered layer prepared by blending the foregoing conductive metal powder with various glass fits such as $B_2O_3$—$Li_2O$—$SiO_2$—BaO based, $B_2O_3$—$SiO_2$—BaO based, $Li_2O$—$SiO_2$—BaO based or $B_2O_3$—$SiO_2$—ZnO based glass frit. It is possible to form a plating layer on this sintered layer. Either a first plating layer 6 comprising Ni, Cu or a Ni—Cu alloy may be merely formed or a second plating layer 7 comprising tin or a solder may be formed on the first plating layer.

The method for producing the laminated ceramic capacitor according to the present invention will be described hereinafter in the order of its production steps with reference to FIGS. 1 to 3.

Powder materials produced by a solid phase method for allowing oxides and carbonates to react at a high temperature or a powder material produced by a wet synthesis method such as a hydrothermal synthesis method or alkoxide method are prepared as starting materials of the dielectric ceramics. A solution of an alkoxide or an organometallic compound may be used for the additives other than oxides and carbonates.

After weighing the prepared materials in a prescribed composition ratio with mixing, the mixed powder is turned into a slurry by adding an organic binder to obtain a green sheet (the dielectric ceramic layers 2a and 2b) by molding the slurry into a sheet. The inner electrodes 4 comprising nickel or a nickel alloy are then formed on one face of the green sheet (the dielectric ceramic layers 2b). Any method including screen printing, vacuum deposition or plating may be used for forming the inner electrodes 4.

Then, a required number of the green sheets (the dielectric ceramic layers 2b) having the inner electrodes 4 are laminated, which are inserted between the green sheets having no inner electrodes (the dielectric ceramic layers 2a) to form a laminated body after pressing. A ceramic laminated body 3 is obtained by firing the laminated body at a given temperature in a reducing atmosphere.

A pair of the outer electrodes 5 are formed on both side ends of the ceramic laminate body 3 so as to be in electrical continuity with the inner electrodes 4. While the outer electrodes 5 are usually formed by coating the metal powder paste on the ceramic laminated body 3 obtained by firing and baking the paste, the outer electrode may be formed simultaneously with forming the ceramic laminated body 3 by coating the paste prior to firing.

Finally, the first plating layer 6 and the second plating layer 7 are formed, if necessary, on the outer electrodes 5, thereby completing the laminated ceramic capacitor 1.

EXAMPLES

Example 1

Starting materials $TiO_2$, $BaCO_3$ and $CaCO_3$ are at first prepared. After mixing and crushing the materials, the mixture is heated at 1000° C. or more to synthesize nine kinds of barium calcium titanate shown in TABLE 1. The mean particle size was determined by observing the particles of the material under a scanning electron microscope.

TABLE 1

| Kind of Barium Calcium Titanate | $(Ba_{1-x}Ca_xO)_nTiO_2$ x | (Ba + Ca)/Ti n | Content of Alkali Metal Oxide Impurities (% by weight) | Mean Particle Size ($\mu$m) |
| --- | --- | --- | --- | --- |
| A | 0.003 | 1.000 | 0.003 | 0.50 |
| B | 0.100 | 1.000 | 0.010 | 0.50 |
| C | 0.200 | 0.998 | 0.012 | 0.50 |
| D | 0.250 | 0.998 | 0.015 | 0.50 |
| E | 0.100 | 1.000 | 0.062 | 0.50 |
| F | 0.080 | 1.005 | 0.003 | 0.15 |
| G | 0.100 | 1.008 | 0.020 | 0.25 |
| H | 0.100 | 1.000 | 0.010 | 0.75 |
| I | 0.100 | 1.000 | 0.010 | 0.08 |

Oxides, carbonates and hydroxides of respective components of the first sub-component were weighed so as to be a composition (molar) ratio of $0.25Li_2O$-$0.65(0.30TiO_2$-$0.70SiO_2$)-$0.10Al_2O_3$ and the mixture was crushed to obtain a powder. Likewise, oxides, carbonates and hydroxides of respective components of the second sub-component were weighed so as to be a composition ratio of $0.66Si_2O$-$0.17TiO_2$-$0.15BaO$-$0.02MnO$ (molar ratio) and the mixture was crushed to obtain a powder. Then, after heating the powders of the first and second sub-components to 1500° C. in different crucibles, respectively, they were quenched and crushed to obtain respective oxide powders with a mean particle size of 1 $\mu$m or less.

In the next step, $BaCO_3$ or $TiO_2$ for adjusting the molar ratio m of (Ba, Ca)/Ti in the barium calcium titanate, and $Y_2O_3$, $Gd_2O_3$, $Tb_2O_3$, $Dy_2O_3$, $Ho_2O_3$, $Er_2O_3$, $Yb_2O_3$, MgO and MnO with purity of 99% or more were prepared. These powder materials and the foregoing oxide powders for the first and second sub-components were weighed to be the compositions shown in TABLE 2. The amount of addition of the first and second sub-components are given in parts by weight relative to 100 parts by weight of the principal component, i.e., $(Ba_{1-x}Ca_xO)_mTiO_2+\alpha Re_2O_3+\beta MgO+\gamma MnO$. A polyvinyl butylal based binder and an organic solvent such as ethanol were added to the weighed materials and the mixture was wet-milled with a ball-mill to prepare a ceramic slurry. This ceramic slurry was formed into a sheet by a doctor blade method, obtaining a rectangular green sheet with a thickness of 4.5 $\mu$m. Then, a conductive paste mainly containing Ni was printed on the ceramic green sheet to form conductive paste layers constituting the inner electrodes.

TABLE 2

| Sample No. | Kind of Barium Calcium Titanate | (Ba1 − xCaxO)m.TiO2 + βMgO + γMnO | | | | | | | | | | | The First Sub-Component (parts by weight) | The Second Sub-Component (parts by weight) |
|---|---|---|---|---|---|---|---|---|---|---|---|---|---|---|
| | | x | m | Y2O3 | Gd2O3 | Tb2O3 | Dy2O3 | Ho2O3 | Er2O3 | Yb2O3 | β | γ | | |
| *1 | A | 0.003 | 1.01 | 0 | 0 | 0 | 0.02 | 0 | 0 | 0 | 0.02 | 0.005 | 1 | 0 |
| *2 | D | 0.250 | 1.01 | 0 | 0 | 0 | 0.02 | 0 | 0 | 0 | 0.02 | 0.005 | 1 | 0 |
| *3 | B | 0.100 | 1.01 | 0 | 0 | 0 | 0.0005 | 0 | 0 | 0 | 0.02 | 0.005 | 1 | 0 |
| *4 | B | 0.100 | 1.01 | 0 | 0 | 0 | 0.11 | 0 | 0 | 0 | 0.02 | 0.005 | 1 | 0 |
| *5 | B | 0.100 | 1.01 | 0 | 0 | 0 | 0.02 | 0 | 0 | 0 | 0.0008 | 0.005 | 1 | 0 |
| *6 | B | 0.100 | 1.01 | 0 | 0 | 0 | 0.02 | 0 | 0 | 0 | 0.13 | 0.005 | 1 | 0 |
| *7 | B | 0.100 | 1.01 | 0 | 0 | 0 | 0.02 | 0 | 0 | 0 | 0.02 | 0.0008 | 1 | 0 |
| *8 | B | 0.100 | 1.01 | 0 | 0 | 0 | 0.02 | 0 | 0 | 0 | 0.02 | 0.13 | 1 | 0 |
| *9 | B | 0.100 | 0.995 | 0 | 0 | 0 | 0.02 | 0 | 0 | 0 | 0.02 | 0.005 | 1 | 0 |
| *10 | B | 0.100 | 1 | 0 | 0 | 0 | 0.02 | 0 | 0 | 0 | 0.02 | 0.005 | 1 | 0 |
| *11 | B | 0.100 | 1.036 | 0 | 0 | 0 | 0.02 | 0 | 0 | 0 | 0.02 | 0.005 | 1 | 0 |
| *12 | B | 0.100 | 1.01 | 0 | 0 | 0 | 0.02 | 0 | 0 | 0 | 0.02 | 0.005 | 0 | 0 |
| *13 | B | 0.100 | 1.01 | 0 | 0 | 0 | 0.02 | 0 | 0 | 0 | 0.02 | 0.1 | 0 | 0 |
| *14 | B | 0.100 | 1.01 | 0 | 0 | 0 | 0.02 | 0 | 0 | 0 | 0.02 | 0.005 | 5.5 | 0 |
| *15 | B | 0.100 | 1.01 | 0 | 0 | 0 | 0.02 | 0 | 0 | 0 | 0.02 | 0.005 | 0 | 5.5 |
| *16 | E | 0.100 | 1.01 | 0 | 0 | 0 | 0.02 | 0 | 0 | 0 | 0.02 | 0.005 | 1 | 0 |
| 17 | H | 0.100 | 1.01 | 0 | 0 | 0 | 0.02 | 0 | 0 | 0 | 0.02 | 0.005 | 1 | 0 |
| 18 | I | 0.100 | 1.01 | 0 | 0 | 0 | 0.02 | 0 | 0 | 0 | 0.02 | 0.005 | 1 | 0 |
| 19 | G | 0.100 | 1.025 | 0.025 | 0 | 0 | 0 | 0 | 0 | 0 | 0.02 | 0.005 | 0 | 1 |
| 20 | G | 0.100 | 1.02 | 0 | 0.08 | 0 | 0 | 0 | 0 | 0 | 0.05 | 0.008 | 4 | 0 |
| 21 | G | 0.100 | 1.015 | 0 | 0 | 0.05 | 0 | 0 | 0 | 0 | 0.05 | 0.005 | 3 | 0 |
| 22 | B | 0.100 | 1.01 | 0 | 0 | 0 | 0 | 0.02 | 0 | 0 | 0.02 | 0.05 | 2 | 0 |
| 23 | B | 0.100 | 1.01 | 0 | 0 | 0 | 0 | 0 | 0.02 | 0 | 0.02 | 0.05 | 0 | 1 |
| 24 | G | 0.200 | 1.005 | 0 | 0 | 0 | 0 | 0 | 0 | 0.03 | 0.02 | 0.05 | 0 | 1 |
| 25 | C | 0.200 | 1.005 | 0.005 | 0 | 0 | 0.02 | 0 | 0 | 0 | 0.02 | 0.005 | 0 | 1 |
| 26 | F | 0.080 | 1.015 | 0.005 | 0.015 | 0 | 0 | 0 | 0 | 0 | 0.02 | 0.005 | 2 | 0 |
| 27 | F | 0.080 | 1.015 | 0 | 0 | 0 | 0.02 | 0 | 0 | 0 | 0.02 | 0.005 | 0 | 2 |

*The samples marked (*) are out of the range of the present invention.

Next, a plurality of ceramic green sheets on which the conductive paste layers had been formed were laminated to obtain a laminated body so that the sides where the conductive paste layers are exposed alternately come to the opposite ends. The laminated body was heated at a temperature of 350° C. in a $N_2$ atmosphere. After driving out the binder, the laminated body was fired in a reducing atmosphere comprising a $H_2$—$N_2$—$H_2O$ gas with an oxygen partial pressure of $10^{-9}$ to $10^{-12}$ MPa to obtain a ceramic sintered body.

After firing, an Ag paste containing a $B_2O_3$—$Li_2$—$SiO_2$—BaO based glass frit was coated on both side faces of the ceramic sintered body, which was baked at a temperature of 600° C. in the $N_2$ atmosphere to form the outer electrodes electrically connected to the inner electrodes.

The laminated ceramic capacitor thus obtained had an overall dimension with a width of 5.0 mm, a length of 5.7 mm and a thickness of 2.4 mm with a thickness of the dielectric ceramic layers inserted between the inner electrodes of 3 μm. The total number of the effective dielectric ceramic layers was five with a confronting electrode area per layer of $16.3 \times 10^{-6}$ m².

Electric characteristics of these laminated ceramic capacitors were then determined. Electrostatic capacitances and dielectric losses (tan δ) were measured per JIS C5102 standard using an automatic bridge type measuring apparatus and dielectric constant was calculated from the electrostatic capacitance obtained. Insulation resistance was also measured using an insulation resistance meter by impressing a direct-current voltage of 10 V for 2 minutes to calculate resistivity (ρ).

DV vias characteristics were also measured. The electrostatic capacitance was determined while impressing a direct-current voltage of 15 V (5 kV/mm) and the rate of change of the electrostatic capacitance (ΔC %) was determined relative to the electrostatic capacitance measured without impressing a direct-current voltage.

The rate of temperature dependent change of the electrostatic capacitance was also measured. The maximum value of the rate of change in the temperature range from −25° C. to 85° C. relative to the capacitance at 20° C. (ΔC/C20) and the maximum value of the rate of change in the temperature range from −55° C. to 125° C. relative to the capacitance at 25° C. (ΔC/C25) were determined with respect to the rate of change of the capacitance.

A high temperature load test was carried out by measuring the time dependent changes of the insulation resistance when a direct-current voltage of 30 V was impressed at 150° C. Lifetime of each sample was defined to be the time when the insulation resistance of each sample had decreased to $10^5$ Ω or less, and a mean lifetime was determined using a plurality of the samples.

The dielectric breakdown voltage was measured by impressing DC voltages with a voltage increasing rate of 100 V/sec. The results are summarized in TABLE 3.

TABLE 3

| Sample No. | Burning Temp. (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| *1 | 1300 | 3360 | 4.5 | −65 | −9.7 | −15.6 | 13.2 | 14 | 3 |
| *2 | 1250 | 1130 | 9.3 | −35 | −4.5 | −6.5 | 13.1 | 15 | 23 |
| *3 | 1250 | 2430 | 4.6 | −55 | −1.5 | −10.6 | 13.2 | 14 | 2 |
| *4 | 1250 | 1220 | 3.1 | −37 | −18.1 | −23.3 | 13.5 | 15 | 15 |
| *5 | 1250 | 2570 | 3.6 | −63 | −15.6 | −24.7 | 12.9 | 12 | 65 |
| *6 | 1350 | 1760 | 4.4 | −45 | −7.8 | −14.6 | 13.1 | 14 | 2 |
| *7 | 1250 | 1950 | 4.7 | −57 | −9.6 | −15.4 | 11.8 | 14 | 17 |
| *8 | 1250 | 1730 | 3.8 | −56 | −13.6 | −19.7 | 11.2 | 14 | 8 |
| *9 | 1250 | 2100 | 5.6 | −60 | −12.3 | −18.6 | 11.2 | 8 | − |
| *10 | 1250 | 2060 | 5.3 | −62 | −12.2 | −17.5 | 11.6 | 9 | − |
| *11 | 1300 | 1950 | 4.4 | −50 | −8.6 | −14.4 | 12.3 | 9 | 1 |
| *12 | 1350 | 1530 | 5.1 | −45 | −8.8 | −13.7 | 11.4 | 10 | − |
| *13 | 1350 | 1470 | 5.3 | −47 | −8.9 | −14.2 | 11.5 | 9 | − |
| *14 | 1200 | 1680 | 3.2 | −48 | −14.5 | −30.6 | 13.1 | 14 | 5 |
| *15 | 1200 | 1740 | 3.4 | −42 | −13.3 | −26.8 | 13.1 | 14 | 3 |
| *16 | 1250 | 1750 | 3.7 | −48 | −10.5 | −15.1 | 13.1 | 14 | 21 |
| 17 | 1250 | 2370 | 4.7 | −51 | −4.7 | −6.7 | 13.1 | 13 | 52 |
| 18 | 1150 | 1040 | 2.5 | −30 | −8.4 | −14.2 | 13.5 | 15 | 174 |
| 19 | 1175 | 1410 | 2.2 | −35 | −9.6 | −14.4 | 13.2 | 14 | 85 |
| 20 | 1150 | 1260 | 2.3 | −33 | −8.8 | −13.7 | 13.2 | 15 | 110 |
| 21 | 1175 | 1260 | 2.3 | −36 | −9.2 | −14.6 | 13.2 | 14 | 105 |
| 22 | 1200 | 1900 | 2.1 | −42 | −8.6 | −13.4 | 13.2 | 14 | 85 |
| 23 | 1250 | 2010 | 2.5 | −44 | −8.5 | −13.8 | 13.2 | 15 | 80 |
| 24 | 1250 | 1430 | 1.8 | −34 | −7.8 | −11.4 | 13.1 | 14 | 110 |
| 25 | 1250 | 1450 | 1.9 | −31 | −8.2 | −11.1 | 13.2 | 15 | 120 |
| 26 | 1175 | 1260 | 1.7 | −32 | −9.5 | −14.5 | 13.2 | 14 | 92 |
| 27 | 1175 | 1340 | 1.6 | −33 | −9.2 | −13.5 | 13.2 | 14 | 95 |

*The samples marked by (*) are out of the range of the present invention.

The cross section of the laminated ceramic capacitor obtained was polished and subjected to chemical etching. It was found from scanning electron microscopic observation of the grain size in the dielectric ceramics that the grain size was almost equal to the particle size of the barium calcium titanate starting material in the samples having the compositions within the range of the present invention.

As are evident from TABLE 1 to TABLE 3, the rate of temperature dependent change of the electrostatic capacitance satisfies the B-grade characteristic standard prescribed in the JIS standard in the temperature range from −25° C. to +85° C., along with satisfying the X7R-grade characteristic standard prescribed in the EIA standard in the temperature range from −55° C. to +125° C., in the laminated ceramic capacitor according to the present invention. In addition, the rate of change of the capacitance when a DC voltage of 5 kV/mm is impressed is as small as within 51%, the change of the electrostatic capacitance being also small when the capacitor is used has thin layers. Moreover, the mean lifetime in the high temperature load test is as long as 52 hours or more, enabling one to fire at a firing temperature of 1250° C. or below.

The reason why the compositions are limited in the present invention will be described hereinafter.

In the composition represented by the following formula:

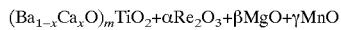

$(Ba_{1−x}Ca_xO)_mTiO_2 + \alpha Re_2O_3 + \beta MgO + \gamma MnO$ ($Re_2O_3$ represents at least one of the compounds selected from $Y_2O_3$, $Gd_2O_3$, $Tb_2O_3$, $Dy_2O_3$, $Ho_2O_3$, $Er_2O_3$ and $Yb_2O_3$ and α, β and γ represent molar ratios), a CaO content (x) of about 0.005 or less as in the sample No. 1 is not preferable since the rate of impressed voltage dependent change of the capacitance becomes large and the mean lifetime becomes extremely short. It is also not preferable that the CaO content (x) exceeds about 0.22 as in the sample No. 2 because the dielectric loss is increased. Accordingly, the preferable CaO content (x) is in the range of $0.005 < x \leq 0.22$.

A $Re_2O_3$ content (α) of less than about 0.001 as in the sample No. 3 is also not preferable because the mean lifetime becomes extremely short. It is also not preferable that the content of $Re_2O_3$ (α) exceed about 0.10 since the temperature characteristics do not satisfy the B/X7R-grade characteristics while the mean lifetime is shortened. Accordingly, the preferable $Re_2O_3$ content (α) is in the range of $0.001 \leq \alpha \leq 0.10$.

A MgO content (β) of less than about 0.001 as in the sample No. 5 is also not preferable because the rate of impressed voltage dependent change of the capacitance becomes large while the temperature characteristics do not satisfy the B/X7R-grade characteristics. It is also not preferable that the amount of addition (β) of MgO exceed about 0.12 as in the sample No. 6 since the sintering temperature becomes high to extremely shorten the mean lifetime. Accordingly, the preferable MgO content (β) is in the range of $0.001 \leq \beta \leq 0.12$.

A MnO content (γ) of less than about 0.001 as in the sample No. 7 is also not preferable because the capacitance is lowered while the mean lifetime is shortened. It is also not preferable that the MnO content (γ) exceed about 0.12 as in the sample No. 8 since the temperature characteristics do not satisfy the B/X7R-grade characteristics, the resistivity becomes low and the mean lifetime is shortened. Accordingly, the preferable range of the MnO content (γ) is $0.001 < \gamma \leq 0.12$.

It is not preferable that the ratio (m) of (Ba, Ca)/Ti is less than about 1.000 as in the samples No. 9 and No. 10 because the temperature characteristics do not satisfy the B/X7R-grade characteristics, thereby lowering the resistivity besides immediately causing short circuit troubles when a voltage is impressed in the high temperature load test. It is also not preferable that the ratio (m) of (Ba, Ca)/Ti exceed about 1.035 as in the sample No. 11 because sintering is insufficient to extremely shorten the mean lifetime. Accordingly, the preferable ratio (m) of (Ba, Ca)/Ti is in the range of $1.000 < m \leq 1.035$.

It is not preferable that the contents of the first and second sub-components are zero as in the samples No. 12 and No. 13 because the resistivity is lowered to immediately cause short circuit troubles when a voltage is impressed in the high temperature load test. It is also not preferable that the contents of the first and second sub-components exceed about 5.0 parts by weight as in the sample Nos. 14 and 15 because the second phase based on glass components is increased and the temperature characteristics do not satisfy the B/X7R-grade characteristics and the mean lifetime is extremely shortened. Accordingly, the preferable content of either the first component or the second component is in the range of about 0.2 to 5.0 parts by weight.

The content of the alkali metal oxides contained in barium calcium titanate as impurities is adjusted to about 0.02% by weight or less because, when the content of the alkali metal oxides exceeds about 0.02% by weight as in the sample No. 16, the mean lifetime is shortened.

The sample No. 17 in which the mean particle size of barium calcium titanate exceeds 0.7 μm shows a little poor mean lifetime of 52 hours. The sample No. 18 in which the mean particle size of barium calcium titanate is less than 0.1 μm shows, on the other hand, a little small dielectric constant of 1040. Accordingly, the preferable mean particle size of barium calcium titanate is in the range from about 0.1 to 0.7 μm.

Example 2

A dielectric powder material represented by the following formula was prepared using the barium calcium titanate (B) in TABLE 1:

(Ba$_{0.90}$Ca$_{0.10}$O)$_{1.010}$·TiO$_2$+0.02Dy$_2$O$_3$+0.02MgO+0.01MnO (molar ratio)

A laminated ceramic capacitor was produced by the same method as used in Example 1, except that a Li$_2$O—(Si,Ti)O$_2$—MO based oxide as the first sub-component having a mean particle size of 1 μm listed in TABLE 4 was added to the mixture above. The size and shape of the laminated ceramic capacitor produced in this example were the same as those in Example 1. The electric characteristic were measured by the same method as used in Example 1. The results are shown in TABLE 5.

TABLE 4

| | | First Subcomponent | | | | |
|---|---|---|---|---|---|---|
| Sample. No. | Amount of addition (parts by weight) | Composition (mol %, except w) | | | | |
| | | Li$_2$O | (Si$_w$Ti$_{1-w}$) | w | Al$_2$O$_3$ | ZrO$_2$ |
| 101 | 1 | 20 | 80 | 0.3 | 0 | 0 |
| 102 | 1 | 10 | 80 | 0.6 | 5 | 5 |
| 103 | 1 | 10 | 70 | 0.5 | 20 | 0 |
| 104 | 2 | 35 | 45 | 1 | 10 | 10 |
| 105 | 2 | 45 | 45 | 0.5 | 10 | 0 |
| 106 | 2 | 45 | 55 | 0.3 | 0 | 0 |
| 107 | 1.5 | 20 | 70 | 0.6 | 5 | 5 |
| 108 | 1.5 | 20 | 70 | 0.4 | 10 | 0 |
| 109 | 2 | 30 | 60 | 0.7 | 5 | 5 |
| 110 | 2 | 30 | 60 | 0.8 | 10 | 0 |
| 111 | 2 | 40 | 50 | 0.6 | 5 | 5 |
| 112 | 2 | 40 | 50 | 0.9 | 0 | 10 |
| 113 | 2 | 10 | 85 | 0.4 | 5 | 0 |
| 114 | 2 | 5 | 75 | 0.6 | 10 | 10 |
| 115 | 3 | 20 | 55 | 0.5 | 25 | 0 |
| 116 | 3 | 45 | 40 | 0.8 | 0 | 15 |
| 117 | 3 | 50 | 45 | 0.7 | 5 | 0 |
| 118 | 2 | 25 | 75 | 0.9 | 0 | 0 |
| 119 | 2 | 25 | 75 | 1 | 0 | 0 |
| 120 | 2 | 35 | 65 | 0.9 | 0 | 0 |
| 121 | 2 | 35 | 65 | 1 | 0 | 0 |
| 122 | 1 | 20 | 70 | 0.2 | 0 | 10 |

TABLE 5

| Sample No. | Burning Temp. (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| 101 | 1250 | 1920 | 2.4 | −43 | −8.2 | −12.8 | 13.2 | 14 | 82 |
| 102 | 1250 | 1910 | 2.4 | −42 | −78 | −12.6 | 13.1 | 15 | 86 |
| 103 | 1250 | 1870 | 2.5 | −41 | −7.7 | −12.3 | 13.2 | 14 | 84 |
| 104 | 1225 | 1850 | 2.4 | −41 | −7.5 | −12.5 | 13.5 | 15 | 88 |
| 105 | 1225 | 1870 | 2.4 | −42 | −7.2 | −11.7 | 13.2 | 14 | 90 |
| 106 | 1225 | 1870 | 2.4 | −40 | −7.8 | −12.0 | 13.1 | 14 | 80 |
| 107 | 1250 | 1910 | 2.4 | −42 | −8.1 | −12.1 | 13.3 | 14 | 85 |
| 106 | 1250 | 1910 | 2.3 | −42 | −7.8 | −11.8 | 13.2 | 14 | 90 |
| 109 | 1225 | 1890 | 2.5 | −41 | −7.7 | −11.7 | 13.3 | 14 | 90 |
| 110 | 1225 | 1900 | 2.5 | −42 | −7.9 | −12.1 | 13.2 | 14 | 95 |
| 111 | 1225 | 1890 | 2.4 | −42 | −7.6 | −12.1 | 13.2 | 15 | 91 |
| 112 | 1225 | 1850 | 2.3 | −40 | −7.6 | −11.8 | 13.3 | 14 | 87 |

TABLE 5-continued

| Sample No. | Burning Temp. (°C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| 113 | 1300 | 1620 | 2.2 | −42 | −7.9 | −12.2 | 11.5 | 9 | − |
| 114 | 1300 | 1460 | 2.4 | −41 | −8.0 | −12.6 | 10.8 | 8 | − |
| 115 | 1300 | 1330 | 2.6 | −42 | −7.8 | −12.5 | 10.6 | 8 | − |
| 116 | 1300 | 1420 | 2.8 | −43 | −7.8 | −12.2 | 10.8 | 8 | − |
| 117 | 1300 | 1360 | 2.4 | −43 | −8.6 | −12.4 | 11.2 | 8 | − |
| 118 | 1250 | 1920 | 2.3 | −43 | −7.8 | −11.7 | 13.2 | 15 | 88 |
| 119 | 1300 | 1450 | 2.1 | −40 | −8.2 | −11.6 | 11.1 | 9 | − |
| 120 | 1250 | 1900 | 2.5 | −42 | −7.6 | −11.7 | 13.2 | 14 | 88 |
| 121 | 1300 | 1350 | 2.1 | −44 | −8.5 | −12.8 | 10.2 | 8 | − |
| 122 | 1350 | 1420 | 2.1 | −44 | −8.2 | −11.5 | 10.2 | 8 | − |

−: Measurement is Impossible

As are evident from Table 4 and Table 5, the sample Nos. 101 to 112, 118 and 120, in which $Li_2O$—$(Si_wTi_{1-w})O_2$—Mo based oxides with compositions within the area surrounded by the straight lines connecting between the succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0) (and where w is in the range of 0.3 ≦w<1.0 when the composition is on the line A–F) or on the lines in a ternary composition diagram having apexes represented by each component $LiO_2$, $(Si_wTi_{1-w})O_2$ and MO (x, y and z are represented by mol % and w is in the range of 0.3≦w≦1.0 when the component is on the line A-F,) are added, has a dielectric constant of as large as 1850, the rate of temperature dependent changes of the electrostatic capacitance satisfy the B-grade characteristic standard prescribed in the JIS standard in the temperature range from −25° C. to +85° C., and satisfy the X7R-grade characteristic standard prescribed in the EIA standard in the temperature range from −55° C. to +125° C. In addition, the rate of change of the capacitance when a DC voltage of 5 kV/mm is impressed is as small as within 43%, the change of the electrostatic capacitance being small when used as thin layers. The mean lifetime under the high temperature load test is as long as 80 hours or more, enabling a firing temperature of 1250° C.

When the compositions of the $Li_2O$—$(Si, Ti)O_2$—Mo based oxides are out of the range of the present invention as in the sample Nos. 113 to 117, 119, 121 and 122, on the contrary, sintering is insufficient to immediately cause short circuit troubles in the high temperature load test.

Example 3

A dielectric powder material represented by the following formula was prepared using barium calcium titanate in TABLE 1-B:

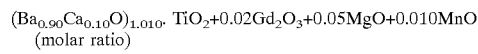

$(Ba_{0.90}Ca_{0.10}O)_{1.010}$ · $TiO_2$+0.02$Gd_2O_3$+0.05MgO+0.010MnO
(molar ratio)

Laminated ceramic capacitors were produced by the same method as used in Example 1, except that $SiO_2$—$TiO_2$—XO based oxides as the second sub-components (including those supplemented with $Al_2O_3$ and $ZrO_2$) as shown in TABLE 6 with a mean particle size of 1 μm or less produced by heating at 1200 to 1500° C. were added to the powder material above. The size and shape of the laminated ceramic capacitors produced are the same as in Example 1. Electric characteristics were measured by the same method as used in Example 1. The results are shown in TABLE 7.

TABLE 6

| Sample No. | Amount of Addition (parts by weight) | Second Sub-Component | | | | | | | | Additive Parts by Weight | |
|---|---|---|---|---|---|---|---|---|---|---|---|
| | | Composition (mol %) | | | | | | | | | |
| | | $SiO_2$ | $TiO_2$ | BaO | CaO | SrO | MgO | ZnO | MnO | Total | |
| | | | | XO | | | | | | | $Al_2O_3$ | $ZrO_2$ |
| 201 | 1 | 85 | 2 | 1 | 0 | 0 | 0 | 4 | 9 | 14 | 0 | 0 |
| 202 | 1 | 35 | 51 | 0 | 10 | 0 | 0 | 0 | 4 | 14 | 0 | 0 |
| 203 | 1 | 30 | 20 | 0 | 30 | 0 | 15 | 4 | 1 | 50 | 0 | 0 |
| 204 | 1 | 39 | 1 | 20 | 20 | 2 | 0 | 13 | 5 | 60 | 0 | 0 |
| 205 | 1 | 70 | 10 | 5 | 5 | 0 | 0 | 10 | 0 | 20 | 0 | 0 |
| 206 | 1 | 45 | 10 | 0 | 0 | 0 | 0 | 15 | 30 | 45 | 0 | 0 |
| 207 | 1 | 50 | 20 | 10 | 10 | 3 | 7 | 0 | 0 | 30 | 0 | 0 |
| 208 | 1 | 50 | 30 | 0 | 16 | 0 | 0 | 0 | 4 | 20 | 0 | 0 |
| 209 | 1 | 35 | 30 | 25 | 10 | 0 | 0 | 0 | 0 | 35 | 0 | 0 |
| 210 | 1 | 40 | 40 | 10 | 0 | 0 | 0 | 5 | 5 | 20 | 0 | 0 |
| 211 | 1 | 45 | 22 | 3 | 30 | 0 | 0 | 0 | 0 | 33 | 15 | 0 |
| 212 | 1 | 45 | 22 | 3 | 30 | 0 | 0 | 0 | 0 | 33 | 10 | 5 |
| 213 | 1 | 65 | 25 | 5 | 5 | 0 | 0 | 0 | 0 | 10 | 0 | 0 |

TABLE 6-continued

| | | Second Sub-Component | | | | | | | | | Additive Parts by Weight | |
|---|---|---|---|---|---|---|---|---|---|---|---|---|
| Sample No. | Amount of Addition (parts by weight) | Composition (mol %) | | | | | | | | | | |
| | | SiO$_2$ | TiO$_2$ | XO | | | | | | | Al$_2$O$_3$ | ZrO$_2$ |
| | | | | BaO | CaO | SrO | MgO | ZnO | MnO | Total | | |
| 214 | 1 | 25 | 40 | 15 | 0 | 10 | 0 | 5 | 5 | 35 | 0 | 0 |
| 215 | 1 | 30 | 10 | 30 | 25 | 0 | 0 | 5 | 0 | 60 | 0 | 0 |
| 216 | 1 | 50 | 0 | 35 | 15 | 0 | 0 | 0 | 0 | 50 | 0 | 0 |
| 217 | 1 | 45 | 22 | 30 | 0 | 0 | 3 | 0 | 0 | 33 | 25 | 0 |
| 218 | 1 | 45 | 22 | 30 | 0 | 3 | 0 | 0 | 0 | 33 | 0 | 15 |
| 219 | 1 | 30 | 60 | 10 | 0 | 0 | 0 | 0 | 0 | 10 | 0 | 0 |

TABLE 7

| Sample No. | Burning Temp. (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| 201 | 1250 | 1940 | 2.4 | −41 | −7.7 | −11.2 | 13.2 | 14 | 92 |
| 202 | 1250 | 1910 | 2.3 | −42 | −7.5 | −11.2 | 13.2 | 15 | 96 |
| 203 | 1250 | 1950 | 2.4 | −42 | −8.1 | −11.6 | 13.3 | 14 | 88 |
| 204 | 1250 | 1920 | 2.3 | −44 | −7.8 | −11.5 | 13.2 | 15 | 85 |
| 205 | 1250 | 1930 | 2.3 | −41 | −8.1 | −11.5 | 13.2 | 14 | 91 |
| 206 | 1250 | 1890 | 2.2 | −40 | −8.0 | −12.1 | 13.4 | 14 | 95 |
| 207 | 1250 | 1910 | 2.3 | −43 | −8.1 | −11.7 | 13.3 | 14 | 88 |
| 208 | 1250 | 1900 | 2.3 | −42 | −8.3 | −11.8 | 13.3 | 14 | 92 |
| 209 | 1250 | 1930 | 2.3 | −43 | −8.1 | −11.9 | 13.3 | 14 | 88 |
| 210 | 1250 | 1920 | 2.3 | −43 | −8.1 | −12.5 | 13.3 | 14 | 85 |
| 211 | 1250 | 1880 | 2.2 | −41 | −7.5 | −11.1 | 13.5 | 15 | 96 |
| 212 | 1250 | 1920 | 2.3 | −42 | −8.3 | −11.8 | 13.6 | 14 | 92 |
| 213 | 1300 | 1620 | 3.1 | −42 | −7.2 | −12.1 | 11.2 | 8 | — |
| 214 | 1300 | 1530 | 2.9 | −42 | −7.3 | −11.8 | 11.1 | 8 | — |
| 215 | 1300 | 1460 | 2.7 | −40 | −7.2 | −12.5 | 11.4 | 9 | — |
| 216 | 1300 | 1470 | 2.7 | −40 | −7.8 | −12.9 | 11.3 | 9 | — |
| 217 | 1300 | 1430 | 2.9 | −38 | −7.1 | −11.7 | 11.5 | 8 | — |
| 218 | 1300 | 1510 | 2.8 | −41 | −6.6 | −11.2 | 11.4 | 8 | — |
| 219 | 1300 | 1480 | 3.1 | −40 | −7.1 | −12.2 | 11.2 | 8 | — |

As are evident from Table 6 and Table 7, the sample Nos. 201 to 210 in which SiO$_2$—TiO$_2$—XO based oxides with compositions within the area surrounded by the straight lines connecting between the succeeding two points represented by A (x=85, y=1, z=14), B (x=35, y=51, z=14), C (x=30, y=20, z=50) and D (x=39, y=1, z=60) or on the lines in a ternary composition diagram having apexes represented by each component SiO$_2$, TiO$_2$ and XO (x, y and z are represented by mol %) are added, has a dielectric constant of as large as 1890 or more, the rate of temperature dependent changes of the electrostatic capacitance satisfy the B-grade characteristic standard prescribed in the JIS standard in the temperature range from −25° C. to +85° C., and satisfy the X7R-grade characteristic standard prescribed in the EIA standard in the temperature range from −55° C. to +125° C. In addition, the rate of change of the capacitance when a DC voltage of 5 kV/mm is impressed is small as within 44%, the change of the electrostatic capacitance being small when used as thin layers. The mean lifetime under the high temperature load test is as long as 85 hours or more, enabling a firing temperature of 1250° C.

When the compositions of the SiO$_2$—TiO$_2$—XO based oxides are out of the range of the present invention as in the sample Nos. 213 to 216 and 219, on the contrary, sintering is insufficient, immediately causing short circuit troubles when a voltage is impressed in the high temperature load test.

While the resistivity can be enhanced by allowing Al$_2$O$_3$ and ZrO$_2$ in the SiO$_2$—TiO$_2$—Xo based oxides as in the sample Nos. 211 and 212, sintering becomes insufficient when the amount of addition of Al$_2$O$_3$ exceeds about 15 parts by weight or the amount of addition of ZrO$_2$ exceeds about 5 parts by weight as in the sample Nos. 217 and 218, immediately causing short circuit troubles when a voltage is impressed in the high temperature load test.

When the dielectric ceramic particles of the samples having the compositions within the range of the present invention obtained in the Examples 1 to 3 were analyzed with a transmission electron microscope, core-shell structures in which the Re components (Re denotes Y, Gd, Tb, Dy, Ho, Er and Yb) are diffused in the vicinity of and at the grain boundary were confirmed.

As is evident from the foregoing descriptions, the dielectric ceramic layers in the laminated ceramic capacitor according to the present invention are composed of a dielectric ceramic composition that is not reduced even when they are fired in a reducing atmosphere. Therefore, base metals such as nickel and a nickel alloy can be used as electrode materials, along with making it possible to reduce the production cost of the laminated ceramic capacitor because the material is able to be fired at a relatively low temperature of 1250° C.

Reduction of the dielectric constant, or the electrostatic capacitance, is small even when a high electric field is impressed on the thin layer of the dielectric ceramic layer in the laminated ceramic capacitor using the dielectric ceramic composition, ensuring high reliability enough for obtaining a small size and thin layered laminated ceramic capacitor having large capacitance.

The dielectric ceramic layers 2a and 2b may be composed of a dielectric ceramic composition containing the principal components comprising barium calcium titanate $(Ba_{1-x}Ca_xO)_mTiO_2$, at least one or more of the oxides selected from $Y_2O_3$, $Gd_2O_3$, $Tb_2O_3$, $Dy_2O_3$, $Ho_2O_3$, $Er_2O_3$ and $Yb_2O_3$, MgO and MnO; and a sub-component selected from $Li_2O$—$B_2O_3$—$(Si, Ti)O_2$ based oxides, $Al_2O_3$—MO—$B_2O_3$ based oxides (MO is at least one oxide selected from BaO, CaO, SrO, MgO, ZnO and MnO) and $SiO_2$. The composition described above allows the ceramic composition to be fired in a reducing atmosphere without endowing it with semi-conductive properties. Consequently, a highly reliable laminated ceramic capacitor with high insulation resistance at room temperature and at high temperatures and having excellent insulation strength can be obtained while the temperature characteristics of the electrostatic capacitance satisfying the B-grade characteristics prescribed in the JIS standard and X7R-grade characteristics prescribed in the EIA standard.

A highly reliable ceramic capacitor, in which the electric field dependent change of dielectric constant is small even when thin ceramic layers are placed in a high field intensity, can be obtained by using a barium calcium titanate material with a mean particle size of about 0.1 to 0.7 μm. The dielectric ceramic has a core-shell structure in which Re components (Re is one or more of the elements selected from Y, Gd, Tb, Dy, Ho, Er and Yb) are distributed in the vicinity and at the grain boundaries due to diffusion during firing.

A highly reliable dielectric material is also obtainable by using a barium calcium titanate material containing about 0.02% by weight or less of alkali metal oxides such as $Na_2O$ and $K_2O$.

Although the ratio (n) of (barium+calcium)/titanium in the barium calcium titanate material is not especially limited, the ratio (n) in the range from about 0.990 to 1.035 is desirable in order to diminish particle size distribution in the synthesize powder when stability for producing the powder material is taken into consideration.

The $Li_2O$—$B_2O_3$—$(Si,Ti)O_2$ based oxides contained in the principal component allows the ceramic to be sintered at a relatively low temperature of 1250° C. with no fear of deterioration of its characteristics due to plating. A much higher insulation resistance is obtained by allowing $Al_2O_3$ and $ZrO_2$ to be contained in the $Li_2O$—$B_2O_3$—$(Si, Ti)O_2$ based oxides. The $Al_2O_3$—MO—$B_2O_3$ based oxides contained in the principal component allows the ceramic to be easily sintered with no fear of deterioration of its characteristics due to plating. Further, $SiO_2$ contained in the principal component also allows the ceramic to be easily sintered with no fear of deterioration of its characteristics due to plating.

The inner electrodes are composed of a base metal such as nickel and a nickel alloy.

The outer electrodes are composed of a sintered layer comprising various conductive metals such as Ag, Pd, Ag—Pd, Cu and a Cu alloy, or a sintered layer produced by blending the conductive metal powder with $B_2O_3$—$LiO_2$—$SiO_2$—BaO based, $B_2O_3$—$SiO_2$—BaO based, $LiO_2$—$SiO_2$—BaO based or $B_2O_3$—$SiO_2$-ZnO based glass frits. Plating layers can be formed on this sintered layer. The plating layer may be merely composed of the first plating layer 6 comprising Ni, Cu or a Ni—Cu alloy, or a second plating layer 7 with a solder or tin may be formed thereon.

The foregoing method for producing the laminated ceramic capacitor can be also used when the materials described above are used.

Example 4

$TiO_2$, $BaCO_3$ and $CaCO_3$ as starting materials were firstly prepared and mixed with crushing. The mixed powder was heated at 1000° C. or more to synthesize nine kinds of barium calcium titanate shown in TABLE 1. Mean particle sizes were determined by observing the material under a scanning electron microscope.

Oxides, carbonates and hydroxides were weighed to be in the composition ratio of $0.25Li_2O$-$0.10B_2O_3$-$0.07TiO_2$-$0.58SiO_2$ (molar ratio) of the first sub-component, and a powder was obtained by crushing with mixing. Likewise, oxides, carbonates and hydroxides were weighed to be in the composition ratio of $0.25Al_2O_3$-$0.17BaO$-$0.03MnO$-$0.55B_2O_3$ (molar ratio) of the second sub-component, and a powder was obtained by crushing with mixing. The powders of these first and second sub-components were independently placed in crucibles to heat at 1400° C. Respective oxide powders with a mean particle size of 1 μm or less were obtained by quenching followed by crushing.

$BaCO_3$ or $TiO_2$, and $Y_2O_3$, $Gd_2O_3$, $Tb_2O_3$, $Dy_2O_3$, $Ho_2O_3$, $Er_2O_3$, $Yb_2O_3$, MgO and MnO with purity of 99% or more were prepared for adjusting the molar ratio (m) of (Ba, Ca)/Ti in barium calcium titanate. These powder materials, and the oxide powders as the first and second sub-components were weighed to be the compositions shown in TABLE 8. The first and second sub-components were added in parts by weight relative to 100 parts by weight of the principal component $(Ba_{1-x}Ca_xO)_mTiO_2+\alpha Re_2O_3+\beta MgO+\gamma MnO$. A polybutyral based binder and an organic solvent such as ethanol were added into the weighed mixture, which was wet-milled to prepare a ceramic slurry. This ceramic slurry was formed into a sheet by a doctor blade method, obtaining a rectangular green sheet with a thickness of 4.5 μm. A conductive paste mainly composed of Ni was printed on this green sheet to form conductive paste layers constituting the inner electrodes.

TABLE 8

| | | | | $(Ba_{1-x}Ca_xO)_m \cdot TiO_2 + \alpha Re_2O_3 + \beta MgO + \gamma MnO$ | | | | | | | | | First Sub-Component | Second Sub-Component |
|---|---|---|---|---|---|---|---|---|---|---|---|---|---|---|
| Sample No. | Kind of Barium Calcium Titanate | x | m | $Y_2O_3$ | $Gd_2O_3$ | $Tb_2O_3$ | $Dy_2O_3$ | $Ho_2O_3$ | $Er_2O_3$ | $Yb_2O_3$ | $\beta$ | $\gamma$ | (parts by weight) | (parts by weight) |
| 1001* | A | 0.003 | 1.01 | 0 | 0 | 0 | 0.02 | 0 | 0 | 0 | 0.02 | 0.005 | 1 | 0 |
| 1002* | D | 0.250 | 1.01 | 0 | 0 | 0 | 0.02 | 0 | 0 | 0 | 0.02 | 0.005 | 1 | 0 |
| 1003* | B | 0.100 | 1.01 | 0 | 0 | 0 | 0.0005 | 0 | 0 | 0 | 0.02 | 0.005 | 1 | 0 |
| 1004* | B | 0.100 | 1.01 | 0 | 0 | 0 | 0.01 | 0 | 0 | 0 | 0.02 | 0.005 | 1 | 0 |
| 1005* | B | 0.100 | 1.01 | 0 | 0 | 0 | 0.02 | 0 | 0 | 0 | 0.008 | 0.005 | 1 | 0 |
| 1006* | B | 0.100 | 1.01 | 0 | 0 | 0 | 0.02 | 0 | 0 | 0 | 0.13 | 0.005 | 1 | 0 |
| 1007* | B | 0.100 | 1.01 | 0 | 0 | 0 | 0.02 | 0 | 0 | 0 | 0.02 | 0.0008 | 1 | 0 |
| 1008* | B | 0.100 | 1.01 | 0 | 0 | 0 | 0.02 | 0 | 0 | 0 | 0.02 | 0.13 | 1 | 0 |
| 1009* | B | 0.100 | 0.995 | 0 | 0 | 0 | 0.02 | 0 | 0 | 0 | 0.02 | 0.005 | 1 | 0 |
| 1010* | B | 0.100 | 1 | 0 | 0 | 0 | 0.02 | 0 | 0 | 0 | 0.02 | 0.005 | 1 | 0 |
| 1011* | B | 0.100 | 1.036 | 0 | 0 | 0 | 0.02 | 0 | 0 | 0 | 0.02 | 0.005 | 1 | 0 |
| 1012* | B | 0.100 | 1.01 | 0 | 0 | 0 | 0.02 | 0 | 0 | 0 | 0.02 | 0.005 | 0 | 0 |
| 1013* | B | 0.100 | 1.01 | 0 | 0 | 0 | 0.02 | 0 | 0 | 0 | 0.02 | 0.1 | 0 | 0 |
| 1014* | B | 0.100 | 1.01 | 0 | 0 | 0 | 0.02 | 0 | 0 | 0 | 0.02 | 0.005 | 5.5 | 0 |
| 1015* | B | 0.100 | 1.01 | 0 | 0 | 0 | 0.02 | 0 | 0 | 0 | 0.02 | 0.005 | 0 | 5.5 |
| 1016* | E | 0.100 | 1.01 | 0 | 0 | 0 | 0.02 | 0 | 0 | 0 | 0.02 | 0.005 | 1 | 0 |
| 1017 | H | 0.100 | 1.01 | 0 | 0 | 0 | 0.02 | 0 | 0 | 0 | 0.02 | 0.005 | 1 | 0 |
| 1018 | I | 0.100 | 1.01 | 0 | 0 | 0 | 0.02 | 0 | 0 | 0 | 0.02 | 0.005 | 1 | 0 |
| 1019 | G | 0.100 | 1.025 | 0.025 | 0 | 0 | 0 | 0 | 0 | 0 | 0.02 | 0.005 | 0 | 1 |
| 1020 | G | 0.100 | 1.02 | 0 | 0.08 | 0 | 0 | 0 | 0 | 0 | 0.05 | 0.008 | 4 | 0 |
| 1021 | G | 0.100 | 1.015 | 0 | 0 | 0.05 | 0 | 0 | 0 | 0 | 0.05 | 0.005 | 3 | 0 |
| 1022 | B | 0.100 | 1.01 | 0 | 0 | 0 | 0 | 0.02 | 0 | 0 | 0.02 | 0.05 | 2 | 0 |
| 1023 | B | 0.100 | 1.01 | 0 | 0 | 0 | 0 | 0 | 0.02 | 0 | 0.02 | 0.05 | 0 | 1 |
| 1024 | C | 0.200 | 1.005 | 0 | 0 | 0 | 0 | 0 | 0 | 0.03 | 0.02 | 0.05 | 0 | 1 |
| 1025 | C | 0.200 | 1.005 | 0.005 | 0 | 0 | 0.02 | 0 | 0 | 0 | 0.02 | 0.005 | 0 | 1 |
| 1026 | F | 0.080 | 1.015 | 0.005 | 0.015 | 0 | 0 | 0 | 0 | 0 | 0.02 | 0.005 | 2 | 0 |
| 1027 | F | 0.080 | 1.015 | 0 | 0 | 0 | 0.02 | 0 | 0 | 0 | 0.02 | 0.005 | 0 | 2 |

*The Samples marked by (*) are out of the range of the present invention.

Next, a plurality of ceramic green sheets on which the conductive paste layers had been formed were laminated to obtain a laminated body so that the sides where the conductive paste layers are alternately exposed come to the opposite ends. The laminated body was heated at a temperature of 350° C. in a $N_2$ atmosphere. After driving out the binder, the laminated body was fired in a reducing atmosphere comprising a $H_2$—$N_2$—$H_2O$ gas with an oxygen partial pressure of $10^{-9}$ to $10^{-12}$ MPa to obtain a ceramic sintered body.

After firing, an Ag paste containing a $B_2O_3$—$Li_2O$—$SiO_2$—BaO based glass frit was coated on both side faces of the ceramic sintered body, which was baked at a temperature of 600° C. in the $N_2$ atmosphere to form the couter electrodes electrically connected to the inner electrodes.

A plating solution comprising nickel sulfate, nickel chloride and boric acid was prepared, and nickel plating layers were formed on the silver outer electrodes by a barrel plating method. Then, a solder plating solution comprising an AS (alkano-sulfonic acid) bath was prepared and a solder plating was applied on the nickel plating layer by the barrel plating method, obtaining a laminated ceramic capacitor in which the outer electrodes were covered with plating layers.

The laminated ceramic capacitor obtained as described above had an overall dimension with a width of 5.0 mm, a length of 5.7 mm and a thickness of 2.4 mm, the thickness of the effective dielectric ceramic layer inserted between the inner electrodes being 3 μm. The total number of the effective dielectric ceramic layers was five with an area of the confronting electrode per layer of $16.3 \times 10^{-6}$ $m^2$.

The electric characteristics of these laminated ceramic capacitors were then determined. The methods for measuring the electrostatic capacitance, dielectric loss (tan δ), insulation resistance, DC bias characteristics and temperature dependency (rate of change) of the electrostatic capacitance, the content of the high temperature load test, and the method for measuring dielectric breakdown voltage were the same as hitherto described. The results are listed in TABLE 9.

TABLE 9

| Sample No. | Burning Temp. (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| *1001 | 1300 | 3310 | 3.8 | −66 | −9.5 | −15.6 | 13.1 | 14 | 3 |
| *1002 | 1250 | 1090 | 9.5 | −33 | −4.3 | −6.1 | 13.1 | 15 | 26 |
| *1003 | 1250 | 2540 | 5.1 | −57 | −3.3 | −9.7 | 13.2 | 14 | 1 |

TABLE 9-continued

| Sample No. | Burning Temp. (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| *1004 | 1250 | 1200 | 3.6 | −41 | −18.4 | −23.4 | 13.3 | 15 | 21 |
| *1005 | 1250 | 2470 | 3.3 | −59 | −14.8 | −22.9 | 12.6 | 14 | 74 |
| *1006 | 1350 | 1570 | 3.7 | −41 | −6.7 | −14.2 | 13.1 | 14 | 3 |
| *1007 | 1250 | 1890 | 2.8 | −44 | −9.4 | −14.8 | 11.7 | 13 | 3 |
| *1008 | 1250 | 1830 | 2.7 | −41 | 9.5 | −14.7 | 12.1 | 14 | 5 |
| *1009 | 1250 | 2070 | 3.9 | −55 | −12.4 | −19.6 | 11.4 | 9 | — |
| *1010 | 1250 | 2050 | 4.7 | −58 | −12.7 | −18.4 | 11.5 | 9 | — |
| *1011 | 1300 | 1950 | 4.4 | −51 | −9.3 | −14.7 | 12.2 | 10 | 1 |
| *1012 | 1350 | 1610 | 5.3 | −47 | −9.2 | −14.1 | 11.5 | 11 | — |
| *1013 | 1350 | 1630 | 5.2 | −48 | −9.3 | −14.5 | 11.7 | 12 | 1 |
| *1014 | 1200 | 1570 | 3.5 | −47 | −13.8 | −29.5 | 13.2 | 14 | 7 |
| *1015 | 1200 | 1680 | 3.3 | −45 | −13.5 | −27.7 | 13.1 | 14 | 5 |
| *1016 | 1250 | 1750 | 3.7 | −45 | −10.8 | −15.4 | 13.1 | 14 | 18 |
| 1017 | 1250 | 2470 | 3.4 | −52 | −5.1 | −7.7 | 13.2 | 14 | 54 |
| 1018 | 1150 | 1050 | 2.3 | −31 | −7.7 | −14.3 | 13.4 | 14 | 162 |
| 1019 | 1175 | 1450 | 2.4 | −33 | −9.7 | −14.7 | 13.2 | 14 | 108 |
| 1020 | 1150 | 1260 | 2.3 | −31 | −9.4 | −14.3 | 13.3 | 15 | 111 |
| 1021 | 1175 | 1310 | 2.5 | −32 | −9.5 | −14.8 | 13.3 | 14 | 107 |
| 1022 | 1200 | 1920 | 2.5 | −41 | −8.5 | −12.8 | 13.2 | 14 | 83 |
| 1023 | 1250 | 1990 | 2.4 | −43 | −8.5 | −12.5 | 13.3 | 14 | 81 |
| 1024 | 1250 | 1430 | 2.5 | −37 | −7.1 | −10.2 | 13.1 | 14 | 110 |
| 1025 | 1250 | 1450 | 2.5 | −35 | −6.8 | −10.8 | 13.2 | 14 | 120 |
| 1026 | 1175 | 1160 | 2.4 | −33 | −9.7 | −14.3 | 13.2 | 14 | 91 |
| 1027 | 1175 | 1270 | 2.1 | −32 | −9.8 | −14.7 | 13.2 | 14 | 94 |

*The Samples marked by (*) are out of the range of the present invention.

The cross section of the laminated ceramic capacitor was polished and subjected to chemical etching to observe the grain diameter of the dielectric ceramic under a scanning electron microscope. It was found that the grain diameter was almost equal to the particles size of the barium calcium titanate material in the samples having the compositions within the range of the present invention.

As is evident from TABLE 8 and TABLE 9, the rate of temperature dependent changes of the electrostatic capacitance in the laminated ceramic capacitor according to the present invention satisfies the B-grade characteristic standard prescribed in the JIS standard in the temperature range from −25° C. to +85° C. and the X7R grade characteristic standard prescribed in the EIA standard in the temperature range from −55° C. to +125° C. Moreover, the rate of change of the capacitance under an impressed DC voltage of 5 kV/mm is as small as 52%, indicating that the change of the electrostatic capacitance is also small when thin layers are used in the capacitor. The mean lifetime in the high temperature load test is as long as 45 hours, enabling one to fire at a temperature of 1250° C or less.

The reasons why the compositions are limited will be described hereinafter.

In the system comprising the principal component;

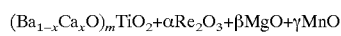

$(Ba_{1-x}Ca_xO)_m TiO_2 + \alpha Re_2O_3 + \beta MgO + \gamma MnO$ ($Re_2O_3$ is at least one or more of the compounds selected from $Y_2O_3$, $Gd_2O_3$, $Tb_2O_3$, $Dy_2O_3$, $Ho_2O_3$, $Er_2O_3$ and $Yb_2O_3$; α, β and γ representing molar ratios), the first and the second sub-components, the content (x) of CaO of about 0.05 or less as in the sample No. 1001 is not preferable since the rate of impressed voltage dependent change of the capacitance is large and the mean lifetime is extremely shortened. A content (x) of CaO exceeding about 0.22 as in the sample No. 1002 is not preferable, on the other hand, since the dielectric loss is increased. Accordingly, the preferable CaO constant (x) is in the range of $0.005 < x \leq 0.22$.

It is not preferable that the $Re_2O_3$ content (α) is less than about 0.001 as in the sample No. 1003 since the mean lifetime is extremely shortened. A $Re_2O_3$ content (α) of exceeding about 0.10 as in the sample No. 1004 is also not preferable, on the other hand, since the temperature characteristics do not satisfy the B/X7R grade characteristics and the mean lifetime is shortened. Accordingly, the preferable $Re_2O_3$ content (α) is in the range of $0.001 \leq \alpha \leq 0.10$.

It is not preferable that the MgO content (β) is less than about 0.001 as in the sample No. 1005 since the temperature characteristics do not satisfy the B/X7R grade characteristics. A MgO content (β) of exceeding about 0.12 as in the sample No. 1006 is also not preferable, on the other hand, since the sintering temperature becomes so high that the mean lifetime is extremely shortened. Accordingly, the preferable MgO content (β) is in the range of $0.001 \leq \beta \leq 0.12$.

It is not preferable that the MnO content (γ) is about 0.001 or less as in the sample No. 1007 since the resistivity is lowered and the mean lifetime is extremely shortened. A MnO content (γ) of exceeding about 0.12 as in the sample No. 1008 is also not preferable, on the other hand, since the mean lifetime is extremely shortened. Accordingly, the preferable MnO content (γ) is in the range of $0.001 < \gamma \leq 0.12$.

It is not preferable that the ratio (m) of (Ba, ca)/Ti is about 1.000 or less as in the sample Nos. 1009 and 1010 since the temperature characteristics do not satisfy the B/X7R grade characteristics and the resistivity becomes low and short circuit troubles are immediately caused when a voltage is impressed in the high temperature load test. It is also not preferable, on the other hand, that the ratio (m) of (Ba, ca)/Ti exceeds about 1.035 as in the sample No. 1011 because sintering becomes insufficient to extremely shorten the mean lifetime. Accordingly, the preferable ratio (m) of (Ba, ca)/Ti is in the range of $1.000<m\leqq1.035$.

It is not preferable that the content of the first and second sub-component is zero as in the sample Nos. 1012 and 1013 since the resistivity becomes low along with immediately causing circuit troubles when a voltage is impressed in the high temperature load test. It is also not preferable, on the other hand, that the content of the first and second sub-components exceed about 5.0 parts by weight as in the sample Nos. 1014 and 1015 because an increased amount of the secondary phase is formed and the temperature characteristics do not satisfy the B/X7R grade characteristics, extremely shortening the mean lifetime. Accordingly, the content of either the first sub-component or the second sub-component is preferably in the range from 0.2 to 5.0.

The content of alkali metal oxides that are contained in barium calcium titanate as impurities is adjusted to about 0.02% by weight or less because, as in the sample No. 1016, the mean lifetime is shortened when the content of the alkali metal oxides exceeds about 0.02% by weight.

size of barium calcium titanate is in the range from about 0.1 to 0.7 $\mu$m.

Example 5

Starting materials $TiO_2$, $BaCO_3$ and $CaCO_3$ were firstly prepared and mixed with crushing as in Example 4. The mixed powder was heated at 1000° C. or more to synthesize nine kinds of barium calcium titanate shown in TABLE 1. Mean particle sizes were determined by observing the material under a scanning electron microscope. $SiO_2$ was also prepared as a third sub-component.

$BaCO_3$ or $TiO_2$ for adjusting the molar ratio (m) of (Ba, Ca)/Ti, and $Y_2O_3$, $Gd_2O_3$, $Tb_2O_3$, $Dy_2O_3$, $Ho_2O_3$, $Er_2O_3$, $Yb_2O_3$, MgO and MnO with purity of 99% or more were prepared. These powder materials and the $SiO_2$ powder as the third sun-component were weighed to be the compositions shown in TABLE 10. The amount of addition of $SiO_2$ is expressed in parts by weight relative to 100 parts by weight of the principal component $(Ba_{1-x}Ca_xO)_mTiO_2 + \alpha Re_2O_3 + \beta MgO + \gamma Mno$.

TABLE 10

$(Ba_{1-x}Ca_xO)_m TiO_2 + \alpha Re_2O_3 + \beta MgO + \gamma MnO$

| Sample No. | Kind of Barium Calcium Titanate | x | m | $Y_2O_3$ | $Gd_2O_3$ | $Tb_2O_3$ | $Dy_2O_3$ | $Ho_2O_3$ | $Er_2O_3$ | $Yb_2O_3$ | $\beta$ | $\gamma$ | Third SubComponent $SiO_2$ (parts by weight) |
|---|---|---|---|---|---|---|---|---|---|---|---|---|---|
| *1101 | A | 0.003 | 1.01 | 0 | 0 | 0 | 0.02 | 0 | 0 | 0 | 0.02 | 0.005 | 1 |
| *1102 | D | 0.250 | 1.01 | 0 | 0 | 0 | 0.02 | 0 | 0 | 0 | 0.02 | 0.005 | 1 |
| *1103 | B | 0.100 | 1.01 | 0 | 0 | 0 | 0.0005 | 0 | 0 | 0 | 0.02 | 0.005 | 1 |
| *1104 | B | 0.100 | 1.01 | 0 | 0 | 0 | 0.11 | 0 | 0 | 0 | 0.02 | 0.005 | 1 |
| *1105 | B | 0.100 | 1.01 | 0 | 0 | 0 | 0.02 | 0 | 0 | 0 | 0.0008 | 0.005 | 1 |
| *1106 | B | 0.100 | 1.01 | 0 | 0 | 0 | 0.02 | 0 | 0 | 0 | 0.13 | 0.005 | 1 |
| *1107 | B | 0.100 | 1.01 | 0 | 0 | 0 | 0.02 | 0 | 0 | 0 | 0.02 | 0.0008 | 1 |
| *1108 | B | 0.100 | 1.01 | 0 | 0 | 0 | 0.02 | 0 | 0 | 0 | 0.02 | 0.13 | 1 |
| *1109 | B | 0.100 | 0.995 | 0 | 0 | 0 | 0.02 | 0 | 0 | 0 | 0.02 | 0.005 | 1 |
| *1110 | B | 0.100 | 1 | 0 | 0 | 0 | 0.02 | 0 | 0 | 0 | 0.02 | 0.005 | 1 |
| *1111 | B | 0.100 | 1.036 | 0 | 0 | 0 | 0.02 | 0 | 0 | 0 | 0.02 | 0.005 | 1 |
| *1112 | B | 0.100 | 1.01 | 0 | 0 | 0 | 0.02 | 0 | 0 | 0 | 0.02 | 0.005 | 0 |
| *1113 | B | 0.100 | 1.01 | 0 | 0 | 0 | 0.02 | 0 | 0 | 0 | 0.02 | 0.1 | 0 |
| *1114 | B | 0.100 | 1.01 | 0 | 0 | 0 | 0.02 | 0 | 0 | 0 | 0.02 | 0.005 | 5.5 |
| *1115 | E | 0.100 | 1.01 | 0 | 0 | 0 | 0.02 | 0 | 0 | 0 | 0.02 | 0.005 | 1 |
| 1116 | H | 0.100 | 1.01 | 0 | 0 | 0 | 0.02 | 0 | 0 | 0 | 0.02 | 0.005 | 1 |
| 1117 | I | 0.100 | 1.01 | 0 | 0 | 0 | 0.02 | 0 | 0 | 0 | 0.02 | 0.005 | 1 |
| 1118 | G | 0.100 | 1.025 | 0.025 | 0 | 0 | 0 | 0 | 0 | 0 | 0.02 | 0.005 | 1 |
| 1119 | G | 0.100 | 1.02 | 0 | 0.08 | 0 | 0 | 0 | 0 | 0 | 0.05 | 0.008 | 4 |
| 1120 | G | 0.100 | 1.015 | 0 | 0 | 0.05 | 0 | 0 | 0 | 0 | 0.05 | 0.005 | 3 |
| 1121 | B | 0.100 | 1.01 | 0 | 0 | 0 | 0 | 0.02 | 0 | 0 | 0.02 | 0.05 | 2 |
| 1122 | B | 0.100 | 1.01 | 0 | 0 | 0 | 0 | 0 | 0.02 | 0 | 0.02 | 0.05 | 1 |
| 1123 | C | 0.200 | 1.005 | 0 | 0 | 0 | 0 | 0 | 0 | 0.03 | 0.02 | 0.05 | 1 |
| 1124 | C | 0.200 | 1.005 | 0.005 | 0 | 0 | 0.02 | 0 | 0 | 0 | 0.02 | 0.005 | 1 |
| 1125 | F | 0.080 | 1.015 | 0.005 | 0.015 | 0 | 0 | 0 | 0 | 0 | 0.02 | 0.005 | 1 |
| 1126 | F | 0.080 | 1.015 | 0 | 0 | 0 | 0.02 | 0 | 0 | 0 | 0.02 | 0.005 | 0.5 |

*The samples marked by (*) are out of the range of the present invention.

The sample No. 1017 in which the mean particle size of barium calcium titanate exceeds 0.7 $\mu$m shows a little poor mean lifetime of 52 hours. The sample No. 1018 in which the mean particle size of barium calcium titanate is less than 0.1 $\mu$m shows, on the other hand, a little smaller dielectric constant of 1050. Accordingly, the preferable mean particle Laminated ceramic capacitors were then produced by the same method as in Example 4. The size and shape of the laminated ceramic capacitors produced were the same as those in Example 4. The electric characteristics were measured by the same method as used in Example 1, the results of which are shown in TABLE 11.

TABLE 11

| Sample No. | Burning Temperature (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| *1101 | 1300 | 1340 | 3.0 | −68 | −9.8 | −15.4 | 13.1 | 15 | 4 |
| *1102 | 1250 | 1110 | 9.4 | −33 | −4.5 | −6.7 | 13.2 | 14 | 21 |
| *1103 | 1250 | 2410 | 2.1 | −57 | −1.7 | −10.6 | 13.3 | 14 | 1 |
| *1104 | 1250 | 1250 | 2.9 | −57 | −18.2 | −13.5 | 13.5 | 15 | 11 |
| *1105 | 1250 | 2610 | 2.5 | −65 | −15.5 | −25.1 | 11.5 | 11 | 13 |
| *1106 | 1350 | 1820 | 2.7 | −48 | −7.9 | −15.1 | 13.1 | 15 | 1 |
| *1107 | 1250 | 1910 | 2.2 | −56 | −9.2 | −15.3 | 11.2 | 14 | 14 |
| *1108 | 1250 | 1700 | 2.4 | −54 | −14.1 | −20.1 | 11.4 | 14 | 7 |
| *1109 | 1250 | 2050 | 4.5 | −59 | −12.3 | −19.2 | 11.2 | 9 | — |
| *1110 | 1250 | 1980 | 2.8 | −63 | −12.5 | −17.2 | 11.7 | 8 | — |
| *1111 | 1300 | 2070 | 3.1 | −52 | −9.0 | −14.1 | 12.4 | 8 | 2 |
| *1112 | 1350 | 1530 | 3.5 | −44 | −8.7 | −13.5 | 11.1 | 11 | - |
| *1113 | 1350 | 1510 | 3.9 | −47 | −8.7 | 14.0 | 11.3 | 8 | - |
| *1114 | 1200 | 1720 | 2.8 | −49 | −15.2 | −29.8 | 13.2 | 14 | 4 |
| *1115 | 1250 | 1710 | 2.2 | −59 | −15.1 | −16.5 | 13.1 | 14 | 10 |
| 1116 | 1250 | 2900 | 1.7 | −52 | −4.8 | −6.5 | 13.2 | 13 | 62 |
| 1117 | 1150 | 1130 | 2.1 | −31 | −10.2 | −14.9 | 13.3 | 15 | 190 |
| 1118 | 1175 | 1400 | 2.1 | −34 | −9.4 | −14.2 | 13.4 | 15 | 89 |
| 1119 | 1150 | 1270 | 2.4 | −34 | −8.7 | −14.1 | 13.2 | 14 | 109 |
| 1120 | 1175 | 1270 | 2.3 | −35 | −9.3 | −14.3 | 13.1 | 14 | 100 |
| 1121 | 1200 | 1910 | 2.0 | −43 | −8.8 | −13.5 | 13 | 15 | 84 |
| 1122 | 1250 | 2030 | 2.1 | −41 | −7.9 | −13.2 | 13.3 | 14 | 92 |
| 1123 | 1250 | 1410 | 2.3 | −35 | −8.1 | −11.8 | 13.1 | 14 | 115 |
| 1124 | 1250 | 1420 | 2.4 | −30 | −7.9 | −11.0 | 13 | 14 | 132 |
| 1125 | 1175 | 1270 | 2.1 | −33 | −9.8 | −14.3 | 13.2 | 15 | 89 |
| 1126 | 1175 | 1310 | 2.0 | −31 | −9.2 | −13.7 | 13.2 | 15 | 98 |

* The samples marked by (*) are out of the range of the present invention.

The grain size of the polished cross section of the laminated ceramic capacitor obtained was determined under a scanning electron microscope after chemical etching, finding that the grain size was almost equal to the particle size of the barium calcium titanate as a starting material in the samples having the compositions within the range of the present invention.

As is evident from TABLE 10 and TABLE 11, the rate of temperature dependent change of the laminated ceramic capacitor according to the present invention satisfies the B-grade characteristic standard prescribed in the JIS standard in the temperature range from −15° C. to +85° C. and the X7R-grade characteristic standard prescribed in the EIA standard in the temperature range from −55° C. to +125° C. Moreover, the rate of change of the capacitance under an impressed DC voltage of 5 kV/mm is as small as 52%, indicating that the change of the electrostatic capacitance is also small when the capacitor is used as a thin layer. The mean lifetime in the high temperature load test is as long as 62 hours, enabling one to fire at a temperature of 1250° C. or less.

The reason why the compositions according to the present invention are limited in the present invention will be described hereinafter.

In the system comprising the principal component

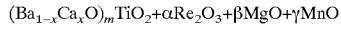

$(Ba_{1-x}Ca_xO)_mTiO_2+\alpha Re_2O_3+\beta MgO+\gamma MnO$ ($Re_2O_3$ represents at least one of the compounds selected from $Y_2O_3$, $Gd_2O_3$, $Tb_2O_3$, $Dy_2O_3$, $Ho_2O_3$, $Er_2O_3$ and $Yb_2O_3$ and α, β and γ represent molar ratios) and the third sub-component, a content (x) of CaO of about 0.005 or less as in the sample No. 1101 is not preferable since the rate of impressed voltage dependent change of the capacitance becomes large besides the mean lifetime becomes extremely short. It is also not preferable that the content (x) of CaO exceeds about 0.22 as in the sample No. 1102 because the dielectric loss is increased. Accordingly, the preferable CaO content (x) is in the range of 0.005<x≦0.22.

A $Re_2O_3$ content (α) of less than about 0.001 as in the sample No. 1103 is also not preferable because the mean lifetime becomes extremely short. It is also not preferable that the content of $Re_2O_3$ (α) exceeds about 0.10 as in the sample No. 1104 since the temperature characteristics do not satisfy the B/X7R-grade characteristics while the mean lifetime is shortened. Accordingly, the preferable $Re_2O_3$ content (α) is in the range of 0.001≦α≦0.10.

A MgO content (β) of less than about 0.001 as in the sample No. 1105 is also not preferable because the rate of impressed voltage dependent change of the capacitance becomes large, the temperature characteristics do not satisfy the B/X7R-grade characteristics and the resistivity is lowered, shortening the mean lifetime. It is also not preferable, on the other hand, that the amount of addition (β) of MgO exceeds about 0.12 as in the sample No. 1106 since the sintering temperature becomes high to extremely shorten the mean lifetime. Accordingly, the preferable MgO content (β) is in the range of 0.001≦β≦0.12.

A MnO content (γ) of less than about 0.001 as in the sample No. 1107 is also not preferable because the resistivity is low while the mean lifetime is shortened. It is also not preferable, on the other hand, that the MnO content (γ) exceeds about 0.12 as in the sample No. 1108 since the temperature characteristics do not satisfy the B/X7R-grade characteristics, the resistivity becomes low and the mean lifetime is shortened. Accordingly, the preferable range of the MnO content (γ) is 0.001≦γ≦0.12.

It is not preferable that the ratio (m) of (Ca, Ca)/Ti is less than about 1.000 as in the sample Nos. 1109 and No. 1110 because the temperature characteristics do not satisfy the B/X7R-grade characteristics and the resistivity is lowered, immediately causing short circuit troubles when a voltage is impressed in the high temperature load test. It is also not preferable, on the other hand, that the ratio (m) of (Ca, Ca)/Ti exceed about 1.035 as in the sample No. 1111 because sintering is insufficient to extremely shorten the mean lifetime. Accordingly, the preferable ratio (m) of (Ca, Ca)/Ti is in the range of 1.000<m≦1.035.

It is not preferable that the contents of the first and second sub-components are zero as in the samples No. 1112 and No. 1113 because the resistivity is lowered to immediately cause short circuit troubles when a voltage is impressed in the high temperature load test. It is also not preferable, on the other hand, that the contents of the first and second sub-components exceed about 5.0 parts by weight as in the sample No. 1114 because the second phase based on glass components is increased besides the temperature characteristics do not satisfy the B/X7R-grade characteristics and the mean lifetime is extremely shortened. Accordingly, the preferable content of either the first component or the second component is in the range from about 0.2 to 5.0 parts by weight.

The content of the alkali metal oxides contained in barium calcium titanate as impurities is adjusted to about 0.02% by weight or less because when the content of the alkali metal oxides exceeds about 0.02% by weight as in the sample No. 1115, the mean lifetime is shortened.

The sample No. 1116 in which the mean particle size of barium calcium titanate exceeds about 0.7 μm shows a little poor mean lifetime of 52 hours. The sample No. 1117 in which the mean particle size of barium calcium titanate is less than about 0.1 μm shows, on the other hand, a little smaller dielectric constant of 1130. Accordingly, the preferable mean particle size of barium calcium titanate is in the range from 0.1 to 0.7 μm.

Example 6

A starting material having the following composition was prepared as a dielectric powder using barium calcium titanate (B) as shown in TABLE 12:

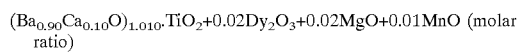

$(Ba_{0.90}Ca_{0.10}O)_{1.010} \cdot TiO_2 + 0.02Dy_2O_3 + 0.02MgO + 0.01MnO$ (molar ratio)

Laminated ceramic capacitors were produced by the same method as used in Example 1, except that the $Li_2O$—$B_2O_3$—$(Si, Ti)O_2$ based oxide (including those supplemented with $Al_2O_3$ and $ZrO_2$) as the first sub-component with a mean particle size of 1 μm or less produced by heating at 1200 to 1500° C. was added to the powder material. The size and shape of the laminated ceramic capacitor produced are the same as that produced in Example 4. The electric characteristics were measured by the same method as in Example 4, the results of which are shown in TABLE 13.

TABLE 12

| Sample. No. | Amount of addition (parts by weight) | First Subcomponent Composition (mol %, except w) | | | | Additive Parts by Weight | |
|---|---|---|---|---|---|---|---|
| | | $Li_2O$ | $B_2O_3$ | $(Si_wTi_{1-w})$ | w | $Al_2O_3$ | $ZrO_2$ |
| 1201 | 1 | 0 | 20 | 80 | 0.7 | 0 | 0 |
| 1202 | 1 | 19 | 1 | 80 | 0.7 | 0 | 0 |
| 1203 | 1 | 49 | 1 | 50 | 0.8 | 0 | 0 |
| 1204 | 2 | 45 | 50 | 5 | 0.5 | 0 | 0 |
| 1205 | 2 | 20 | 75 | 5 | 0.4 | 0 | 0 |
| 1206 | 2 | 0 | 80 | 20 | 0.4 | 0 | 0 |
| 1207 | 1.5 | 35 | 15 | 50 | 0.5 | 0 | 0 |
| 1208 | 1.5 | 35 | 50 | 15 | 0.9 | 0 | 0 |
| 1209 | 2 | 20 | 40 | 40 | 0.3 | 0 | 0 |
| 1210 | 2 | 10 | 15 | 75 | 0.7 | 0 | 0 |
| 1211 | 2 | 10 | 70 | 20 | 0.4 | 5 | 2 |
| 1212 | 2 | 35 | 15 | 50 | 0.7 | 15 | 5 |
| 1213 | 2 | 35 | 15 | 50 | 0.7 | 20 | 0 |
| 1214 | 2 | 35 | 15 | 50 | 0.7 | 0 | 10 |
| 1215 | 3 | 10 | 5 | 85 | 0.5 | 0 | 0 |
| 1216 | 3 | 55 | 20 | 25 | 0.7 | 0 | 0 |
| 1217 | 3 | 35 | 62 | 3 | 0.7 | 0 | 0 |
| 1218 | 2 | 5 | 85 | 10 | 0.7 | 0 | 0 |
| 1219 | 2 | 10 | 15 | 75 | 0.1 | 0 | 0 |
| 1220 | 2 | 35 | 50 | 15 | 1 | 0 | 0 |
| 1221 | 2 | 35 | 50 | 15 | 0.7 | 30 | 0 |
| 1222 | 1 | 35 | 50 | 15 | 0.7 | 0 | 20 |

TABLE 13

| Sample No. | Burning Temperature (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| 1201 | 1250 | 1880 | 2.4 | −42 | −7.8 | −12.5 | 13.0 | 13 | 81 |
| 1202 | 1250 | 1870 | 2.4 | −43 | −7.6 | −12.4 | 13.1 | 13 | 88 |
| 1203 | 1250 | 1850 | 2.3 | −42 | −7.8 | −12.4 | 13.1 | 13 | 83 |
| 1204 | 1225 | 1830 | 2.3 | −41 | −7.7 | −12.1 | 13.1 | 13 | 85 |
| 1205 | 1225 | 1860 | 2.5 | −41 | −7.1 | −12.1 | 13.0 | 13 | 84 |
| 1206 | 1225 | 1840 | 2.4 | −40 | −8.1 | −12.5 | 13.1 | 13 | 80 |
| 1207 | 1250 | 1880 | 2.4 | −43 | −8.0 | −11.8 | 13.0 | 13 | 86 |
| 1208 | 1250 | 1900 | 2.5 | −45 | −8.3 | −12.7 | 13.0 | 12 | 88 |
| 1209 | 1225 | 1850 | 2.4 | −44 | −7.7 | −12.3 | 13.1 | 13 | 83 |
| 1210 | 1225 | 1870 | 2.4 | −45 | −7.9 | −12.5 | 13.0 | 13 | 83 |
| 1211 | 1225 | 1880 | 2.4 | −44 | −8.0 | −12.6 | 13.3 | 14 | 91 |

TABLE 13-continued

| Sample No. | Burning Temperature (° C.) | Dielectric Constant | Dielectric Loss tan δ (%) | Rate of Change of Capacitance ΔC% DC 5Kv/mm | Rate of Temperature Dependent Change of Capacitance ΔC/C20% −25~+85° C. (%) | Rate of Temperature Dependent Change of Capacitance ΔC/C25% −55~+125° C. (%) | Resistivity Log ρ (Ω.cm) | Dielectric Breakdown Voltage DC (kV/mm) | Mean Lifetime (h) |
|---|---|---|---|---|---|---|---|---|---|
| 1212 | 1225 | 1860 | 2.3 | −44 | −8.5 | −12.5 | 13.3 | 14 | 97 |
| 1213 | 1225 | 1810 | 2.2 | −43 | −8.2 | −12.4 | 13.4 | 14 | 95 |
| 1214 | 1225 | 1780 | 2.2 | −43 | −7.5 | −12.1 | 13.3 | 14 | 92 |
| 1215 | 1350 | 1650 | 4.3 | −42 | −7.2 | −11.7 | 11.1 | 12 | 2 |
| 1216 | 1350 | 1770 | 4.1 | −42 | −7.4 | −11.8 | 11.4 | 10 | 7 |
| 1217 | 1300 | 1580 | 3.5 | −41 | −7.3 | −11.3 | 11.6 | 11 | 26 |
| 1218 | 1300 | 1870 | 3.4 | −44 | −7.8 | −11.8 | 11.8 | 11 | 18 |
| 1219 | 1350 | 1830 | 4.7 | −44 | −7.7 | −12.1 | 11.1 | 11 | 4 |
| 1220 | 1300 | 1910 | 3.9 | −45 | −8.1 | −12.7 | 12.4 | 12 | 22 |
| 1221 | 1350 | 1880 | 4.7 | −44 | −7.9 | −12.6 | 10.8 | 12 | 1 |
| 1222 | 1350 | 1920 | 5.6 | −45 | −8.3 | −13.4 | 10.7 | 12 | 2 |

As is evident from TABLE 12 and TABLE 13, the sample Nos. 1201 to 1210, in which $Li_2O$—$B_2O_3$—$(Si_wTi_{1-w})O_2$ based oxides with compositions within the area surrounded by the straight lines connecting between the succeeding two points represented by A (x=0, y=20, z=80), B (x=19, y=1, z=80), C (x=49, y=1, z=50), D (x=45, y=50, z=5), E (x=20, y=75, z=5) and F (x=0, y=80, z=20) or on the lines in a ternary composition diagram having apexes represented by each component $Li_2O$, $B_2O_3$ and $Si_w,Ti_{1-w})O_2$ (x, y and z are represented by mol %) are added, has a dielectric constant of as large as 1830 or more, the rate of temperature dependent changes of the electrostatic capacitance satisfy the B-grade characteristic standard prescribed in the JIS standard in the temperature range from −25° C. to +85° C., and satisfy the X7R-grade characteristic standard prescribed in the EIA standard in the temperature range from −55° C. to +125° C. In addition, the rate of change of the capacitance when a DC voltage of 5 kV/mm is impressed is as small as within 45%, the change of the electrostatic capacitance being small when used as thin layers. The mean lifetime under the high temperature load test is as long as 80 hours or more, enabling a firing temperature of 1250° C.

When the content of the $Li_2O$—$B_2O_3$—(Si, Ti)$O_2$ based oxide is out of the range of the present invention as in the sample Nos. 1215 and 1220, on the contrary, sintering is insufficient or electric characteristics are deteriorated due to plating after firing, shortening the mean lifetime in the high temperature load test.

While the resistivity can be enhanced by allowing $Al_2O_3$ and $ZrO_2$ to be contained in the $Li_2O$—$B_2O_3$—(Si, Ti)$O_2$ based oxide as in the sample Nos. 1211 and 1214, sintering becomes insufficient to shorten the mean lifetime in the high temperature load test as in the sample Nos. 1221 and 1222 when the amount of addition of $Al_2O_3$ exceeds 20 parts by weight or the amount of addition of $ZrO_2$ exceeds 10 parts by weight.

Example 7

A starting material having the following composition was prepared as a dielectric powder using barium calcium titanate (B) as shown in TABLE 14:

$(Ba_{0.90}Ca_{0.10}O)_{1.010} \cdot TiO_2 + 0.02Gd_2O_3 + 0.05MgO + 0.010MnO$
(molar ratio)

Laminated ceramic capacitors were produced by the same method as used in Example 1, except that the $Al_2O_3$—MO—$B_2O_3$ based oxide as the second sub-component with a mean particle size of 1 μm or less produced by heating at 1200 to 1500° C. as shown in TABLE 14 was added to the powder material. The size and shape of the laminated ceramic capacitor produced are the same as that produced in Example 4. The electric characteristics were measured by the same method as in Example 4, the results of which are shown in TABLE 15.

TABLE 14

| Sample No. | Amount of Addition | The Second Sub-Component Composition (mol %) | | | | | | | | |
|---|---|---|---|---|---|---|---|---|---|---|
| | | $Al_2O_3$ | MO BaO | CaO | SrO | MgO | ZnO | MnO | Total | $B_2O_3$ |
| 1301 | 1 | 1 | 5 | 5 | 0 | 0 | 0 | 4 | 14 | 85 |
| 1302 | 1 | 20 | 8 | 0 | 0 | 0 | 2 | 0 | 10 | 70 |
| 1303 | 1 | 30 | 6 | 10 | 2 | 2 | 0 | 0 | 20 | 50 |
| 1304 | 1 | 40 | 0 | 30 | 0 | 0 | 5 | 15 | 50 | 10 |
| 1305 | 1 | 20 | 0 | 30 | 0 | 0 | 10 | 30 | 70 | 10 |
| 1306 | 1 | 1 | 0 | 5 | 5 | 24 | 5 | 0 | 39 | 60 |
| 1307 | 1 | 15 | 10 | 0 | 0 | 0 | 3 | 2 | 15 | 70 |
| 1308 | 1 | 10 | 10 | 15 | 0 | 5 | 0 | 5 | 35 | 55 |
| 1309 | 1 | 20 | 0 | 30 | 5 | 0 | 3 | 2 | 40 | 40 |
| 1310 | 1 | 30 | 5 | 35 | 5 | 0 | 5 | 0 | 50 | 20 |

TABLE 14-continued

| | | | The Second Sub-Component | | | | | | | |
|---|---|---|---|---|---|---|---|---|---|---|
| | Amount | | | | Composition (mol %) | | | | | |
| Sample No. | of Addition | $Al_2O_3$ | BaO | CaO | MO SrO | MgO | ZnO | MnO | Total | $B_2O_3$ |
| 1311 | 1 | 5 | 10 | 0 | 0 | 0 | 0 | 0 | 10 | 85 |
| 1312 | 1 | 30 | 5 | 5 | 0 | 0 | 0 | 0 | 10 | 60 |
| 1313 | 1 | 40 | 20 | 0 | 0 | 0 | 3 | 2 | 25 | 35 |
| 1314 | 1 | 60 | 30 | 0 | 0 | 0 | 3 | 2 | 35 | 5 |
| 1315 | 1 | 5 | 15 | 35 | 10 | 0 | 3 | 2 | 65 | 30 |
| 1316 | 1 | 0 | 15 | 15 | 0 | 0 | 0 | 0 | 30 | 70 |

TABLE 15

| Sample No. | Burning Temperature (° C.) | Dielectric Constant | Dielectric Loss tan δ (%) | Rate of Change of Capacitance ΔC% DC 5Kv/mm | Rate of Temperature Dependent Change of Capacitance | | Resistivity Log ρ (Ω.cm) | Dielectric Breakdown Voltage DC (kV/mm) | Mean Lifetime (h) |
|---|---|---|---|---|---|---|---|---|---|
| | | | | | ΔC/C20% −25~+85° C. (%) | ΔC/C25% −55~+125° C. (%) | | | |
| 1301 | 1250 | 1860 | 2.4 | −43 | −7.2 | −10.9 | 13.2 | 13 | 87 |
| 1302 | 1250 | 1870 | 2.4 | −43 | −7.3 | −11.1 | 13.1 | 13 | 87 |
| 1303 | 1250 | 1900 | 2.5 | −45 | −8.1 | −12.2 | 13.2 | 13 | 84 |
| 1304 | 1250 | 1880 | 2.4 | −45 | −7.8 | −12.2 | 13.2 | 13 | 88 |
| 1305 | 1250 | 1890 | 2.4 | −43 | −8.0 | −12.3 | 13.2 | 13 | 92 |
| 1306 | 1250 | 1850 | 2.3 | −43 | −7.9 | −12.1 | 13.2 | 14 | 88 |
| 1307 | 1250 | 1870 | 2.5 | −44 | −7.5 | −11.9 | 13.2 | 13 | 90 |
| 1308 | 1250 | 1880 | 2.5 | −45 | −7.9 | −12.2 | 13.3 | 13 | 88 |
| 1309 | 1250 | 1790 | 2.3 | −43 | −7.3 | −11.8 | 13.2 | 14 | 92 |
| 1310 | 1250 | 1830 | 2.3 | −42 | −8.0 | −12.1 | 13.2 | 13 | 87 |
| 1311 | 1350 | 1780 | 3.7 | −41 | −7.8 | −11.8 | 11.5 | 11 | 3 |
| 1312 | 1350 | 1560 | 4.5 | −41 | −7.1 | −11.4 | 10.9 | 10 | 2 |
| 1313 | 1350 | 1630 | 5.1 | −43 | −7.8 | −11.7 | 11.1 | 10 | 1 |
| 1314 | 1350 | 1810 | 3.5 | −48 | −8.4 | −12.1 | 11.2 | 11 | 2 |
| 1315 | 1350 | 1650 | 5.7 | −44 | −7.7 | −11.9 | 11.1 | 11 | 4 |
| 1316 | 1250 | 1820 | 4.8 | −47 | −8.1 | −12.5 | 11.4 | 12 | 5 |

As is evident from TABLE 14 and TABLE 15, the sample Nos. 1301 to 1310, in which $Al_2O_3$—MO—$B_2O_3$ based oxides with compositions within the area surrounded by the straight lines connecting between the succeeding two points represented by A (x=1, y=14, z=85), B (x=20, y=10, z=70), C (x=30, y=20, z=50), D (x=40, y=50, z=10), E (x=20, y=70, z=10) and F (x=1, y=39, z=60) or on the lines in a ternary composition diagram having apexes represented by each component $Al_2O_3$, MO and $B_2O_3$ are added, have a dielectric constant of as large as 1790 or more, the rate of temperature dependent changes of the electrostatic capacitance satisfy the B-grade characteristic standard prescribed in the JIS standard in the temperature range from −25° C. to +85° C., and satisfy the X7R-grade characteristic standard prescribed in the EIA standard in the temperature range from −55° C. to +125° C. In addition, the rate of change of the capacitance when a DC voltage of 5 kV/mm is impressed is as small as within 45%, the change of the electrostatic capacitance being small when used as thin layers. The mean lifetime under the high temperature load test is as long as 84 hours or more, enabling a firing temperature of 1250° C.

When the content of the $Al_2O_3$—MO—$B_2O_3$ based oxide is out of the range of the present invention as in the sample Nos. 1311 to 1316, on the contrary, sintering is insufficient or electric characteristics are deteriorated due to plating after firing, shortening the mean lifetime in the high temperature load test.

From the results obtained by analyzing the in the dielectric ceramic particles under a transmission electron microscope with respect to the samples having the compositions within the range of the present invention obtained in Examples 4 to 7, it was confirmed that all the samples have core-shell structures in which the Re components (Re represents Y, Gd, Tb, Dy, Ho, Er and Yb) are diffused in the vicinity of or at the grain boundaries.

Accordingly, the present invention provides a highly reliable and plating solution resistive ceramic capacitor using Ni or a Ni alloy for the inner electrodes.

What is claimed is:

1. A dielectric ceramic comprising

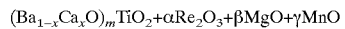
$(Ba_{1-x}Ca_xO)_mTiO_2 + \alpha Re_2O_3 + \beta MgO + \gamma MnO$ in which Re is at least one member selected from the group consisting of Y, Gd, Tb, Dy, Ho, Er and Yb; α, β γ, m and x are molar ratios; $0.001 \leq \alpha \leq 0.10$; $0.001 \leq \beta \leq 0.12$; $0.001 < \gamma \leq 0.12$; $1.000 < m \leq 1.035$; and $0.005 < x \leq 0.22$, and
about 0.2 to 5.0 parts by weight of either a first sub-component or a second sub-component or a third sub-component relative to 100 parts by weight of $(Ba_{1-x}Ca_xO)_mTiO_2$, wherein
the $(Ba_{1-x}Ca_xO)_mTiO_2$ contains about 0.02% by weight or less of alkali metal oxides, the first sub-component is a $Li_2O$—$(Si,Ti)O_2$—MO oxide in which M is at least one of Al and Zr, the second sub-component is a $SiO_2$—$TiO_2$—XO oxide in which X is at least one selected from the group consisting of Ba, Ca, Sr, Mg, Zn and Mn, and the third sub-component is $SiO_2$.

2. A dielectric ceramic according to claim 1, wherein the $(Ba_{1-x}Ca_xO)_mTiO_2$ has a mean particle size of about 0.1 to 0.7 μm.

3. A dielectric ceramic according to claim 1, wherein the first sub-component is present and comprises $xLiO_2$—$y(Si_wTi_{1-w})O_2$—$zMO$, x, y and z are molar percentages and $30 \leq w \leq 1.0$, and is within the area surrounded by straight lines connecting between succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0) or on said lines in a ternary composition diagram having apexes represented by the components $LiO_2$, $(Si_wTi_{1-w})O_2$ and MO, provided that when the first sub-component is on the line A–F, $0.3 \leq w < 1.0$.

4. A dielectric ceramic according to claim 3, wherein comprising at least one of $Al_2O_3$ and $ZrO_2$ in a combined amount of about 20 parts by weight or less and in which the $ZrO_2$ is 10 parts by weight or less relative to 100 parts by weight of the $Li_2O$—$(Si,Ti)O_2$—MO oxide.

5. A dielectric ceramic according to claim 3, wherein said points are A (x=0, y=20, z=80), B (x=19, y=1, z=80), C (x=49, y=1, z=50), D (x=45, y=50, z=5), E (x=20, y=75, z=5) and F (x=0, y=80, z=20) and wherein the $(Ba_{1-x}Ca_xO)_m$ $TiO_2$ has a mean particle size of about 0.1 to 0.7 μm.

6. A dielectric ceramic according to claim 1, wherein the second sub-component is present and comprises $xSiO_2$—$yTiO_2$—$zXO$, x, y and z are molar percentages, and is within the area surrounded by straight lines connecting between succeeding two points represented by A (x=85, y=1, z=14), B (x=35, y=51, z=14), C (x=30, y=20, z=50) and D (x=39, y=1, z=60) or on said lines in a ternary composition diagram having apexes represented by the components $SiO_2$, $TiO_2$ and XO.

7. A dielectric ceramic according to claim 6, comprising at least one of $Al_2O_3$ and $ZrO_2$ in a combined amount of about 15 parts by weight or less and the $ZrO_2$ is 5 parts by weight or less relative to 100 parts by weight of the $SiO_2$—$TiO_2$—XO oxide.

8. A dielectric ceramic according to claim 6, wherein said points are A (x=1, y=14, z=85), B (x=20, y=10, z=70), C (x=30, y=20, z=50), D (x=40, y=50, z=10), E (x=20, y=70, z=10) and F (x=1, y=39, z=60) and wherein the $(Ba_{1-x}Ca_xO)_m TiO_2$ has a mean particle size of about 0.1 to 0.7 μm.

9. A dielectric ceramic according to claim 1 in which the third sub-component is present.

10. A dielectric ceramic according to claim 2, wherein the molar ratio of (Ba+Ca)/Ti is about 0.99 to 1.035.

11. A laminated ceramic capacitor having:

a plurality of dielectric layers containing the dielectric ceramic according to claim 1;

a plurality of inner dielectric layers comprising Ni or a Ni alloy and existing among a plurality of said dielectric layers; and external electrodes in electrical continuity to a plurality of said inner dielectric layers and being on the surface of said ceramic capacitor.

12. A laminated ceramic capacitor according to claim 11, wherein said external electrodes comprise a sintered layer of conductive metal powder or conductive metal powder and glass frit.

13. A laminated ceramic capacitor having:

a plurality of dielectric layers containing the dielectric ceramic according to claim 2;

a plurality of inner dielectric layers comprising Ni or a Ni alloy and existing among a plurality of said dielectric layers; and external electrodes in electrical continuity to a plurality of said inner dielectric layers and being on the surface of said ceramic capacitor.

14. A laminated ceramic capacitor according to claim 13, wherein said external electrodes comprise a sintered layer of conductive metal powder or conductive metal powder and glass frit.

15. A laminated ceramic capacitor having:

a plurality of dielectric layers containing the dielectric ceramic according to claim 3;

a plurality of inner dielectric layers comprising Ni or a Ni alloy and existing among a plurality of said dielectric layers; and external electrodes in electrical continuity to a plurality of said inner dielectric layers and being on the surface of said ceramic capacitor.

16. A laminated ceramic capacitor according to claim 15, wherein said external electrodes comprise a sintered layer of conductive metal powder or conductive metal powder and glass frit.

17. A laminated ceramic capacitor having:

a plurality of dielectric layers containing the dielectric ceramic according to claim 6;

a plurality of inner dielectric layers comprising Ni or a Ni alloy and existing among a plurality of said dielectric layers; and external electrodes in electrical continuity to a plurality of said inner dielectric layers and being on the surface of said ceramic capacitor.

18. A laminated ceramic capacitor according to claim 17, wherein said external electrodes comprise a sintered layer of conductive metal powder or conductive metal powder and glass frit.

19. A laminated ceramic capacitor having:

a plurality of dielectric layers containing the dielectric ceramic according to claim 9;

a plurality of inner dielectric layers comprising Ni or a Ni alloy and existing among a plurality of said dielectric layers; and external electrodes in electrical continuity to a plurality of said inner dielectric layers and being on the surface of said ceramic capacitor.

20. A laminated ceramic capacitor according to claim 19, wherein said external electrodes comprise a sintered layer of conductive metal powder or conductive metal powder and glass frit.

* * * * *

(12) EX PARTE REEXAMINATION CERTIFICATE (9908th)
United States Patent
Wada et al.

(10) Number: US 6,243,254 C1
(45) Certificate Issued: Oct. 25, 2013

(54) DIELECTRIC CERAMIC COMPOSITION AND LAMINATED CERAMIC CAPACITOR USING THE SAME

(75) Inventors: Nobuyuki Wada, Shiga-ken (JP); Masamitsu Shibata, Kyoto (JP); Takashi Hiramatsu, Shiga-ken (JP); Yukio Hamaji, Otsu (JP)

(73) Assignee: Murata Manufacturing Co., Ltd., Nagaokakyo, Kyoto-fu (JP)

Reexamination Request:
No. 90/010,836, Jan. 29, 2010
No. 90/011,473, Feb. 2, 2011

Reexamination Certificate for:
Patent No.: 6,243,254
Issued: Jun. 5, 2001
Appl. No.: 09/369,988
Filed: Aug. 6, 1999

(30) Foreign Application Priority Data

Aug. 11, 1998 (JP) .................................. 10-227202
Aug. 11, 1998 (JP) .................................. 10-227203

(51) Int. Cl.
*H01G 4/06* (2006.01)

(52) U.S. Cl.
USPC ............... 361/311; 361/321.2; 361/321.5; 501/134

(58) Field of Classification Search
None
See application file for complete search history.

(56) References Cited

To view the complete listing of prior art documents cited during the proceedings for Reexamination Control Numbers 90/010,836 and 90/011,473, please refer to the USPTO's public Patent Application Information Retrieval (PAIR) system under the Display References tab.

*Primary Examiner* — Minh Nguyen

(57) ABSTRACT

Provided is a highly reliable laminated ceramic capacitor in which decrease of dielectric constant under a high electric field is small and which satisfies the B-grade and X7R grade characteristics, using Ni for the inner electrodes, wherein the dielectric material contains about 0.2 to 5.0 parts by weight of $Li_2O$—$(Si, Ti)_2$—MO oxides (MO is at least one of the compounds of $Al_2O_3$ and $ZrO_2$) or $SiO_2$—$TiO_2$—XO oxides (XO is at least one of the compounds of BaO, CaO, SrO, MgO, ZnO and MnO) relative to 100 parts by weight of a principal component represented by $(Ba_{1-x}Ca_xO)_m TiO_2 + \alpha Re_2O_3 + \beta MgO + \gamma MnO$ ($Re_2O_3$ represents at least one of $Y_2O_3$, $Gd_2O_3$, $Tb_2O_3$, $Dy_2O_3$, $Ho_2O_3$, $Er_2O_3$ and $Yb_2O_3$).

At the time of issuance and publication of this certificate, the patent remains subject to pending reissue application number 13/951,614 filed Jul. 26, 2013. The claim content of the patent may be subsequently revised if a reissue patent is issued from the reissue application.

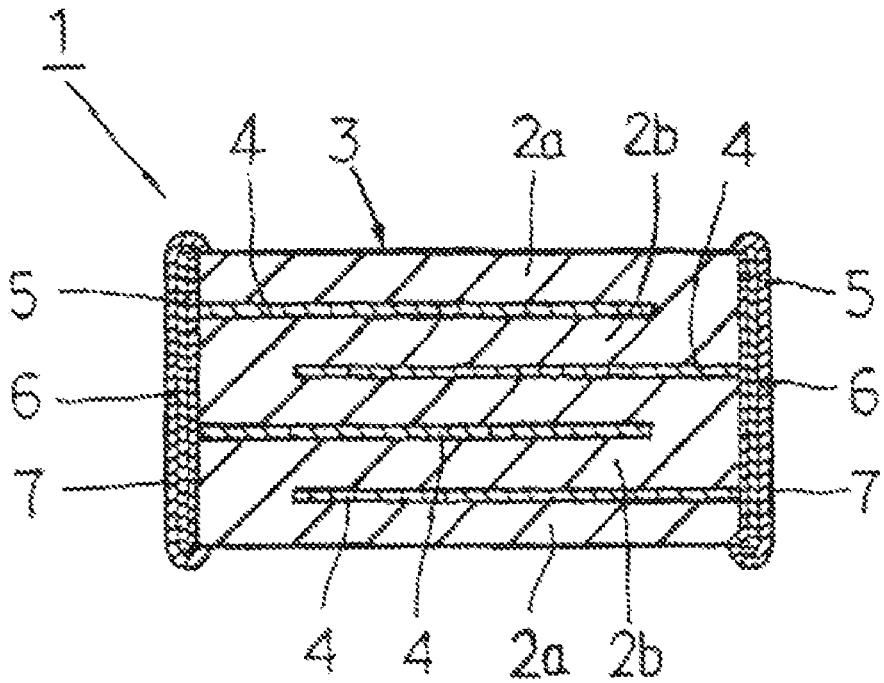

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 40-51:

The first sub-component represented by [$xLiO_2$] $xLi_2O$—$y(Si_wTi_{1-w})Q_2$—$zMO$ (x, y and z are represented by molar percentage (mol %) and w is in the range of $0.3 \leq w \leq 1.0$) may be within the area surrounded by the straight lines connecting between the succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0) or on the lines in a ternary composition diagram having apexes represented by each component [$LiO_2$] $Li_2O$, $(Si_wTi_{1-w})O_2$ and MO provided that when the component is on the line A-F, w is in the range of $0.3 \leq w \leq 1.0$.

Column 3, lines 30-39:

The first sub-component represented by [$xLiO_2$]$xLi_2O$—$YB_2O_3$—$Z(Si_wTi_{1-w})O_2$(x, y and z are represented by mol % and w is in the range of $0.30 \leq w \leq 1.0$) is preferably within the area surrounded by the straight lines connecting between the succeeding two points represented by A (x=0, y=20, z=80), B (x=19, y=1, z=80), C (x=49, y=1, z=50), D (x=45, y=50, z=5), E (x=20, y=75, z=5) and F (x=0, y=80, z=20) or on the lines in a ternary composition diagram having apexes represented by each component [$LiO_2$] $Li_2O$, $B_2O_3$ and $(Si_wTi_{1-w})O_2$.

Figure 4:
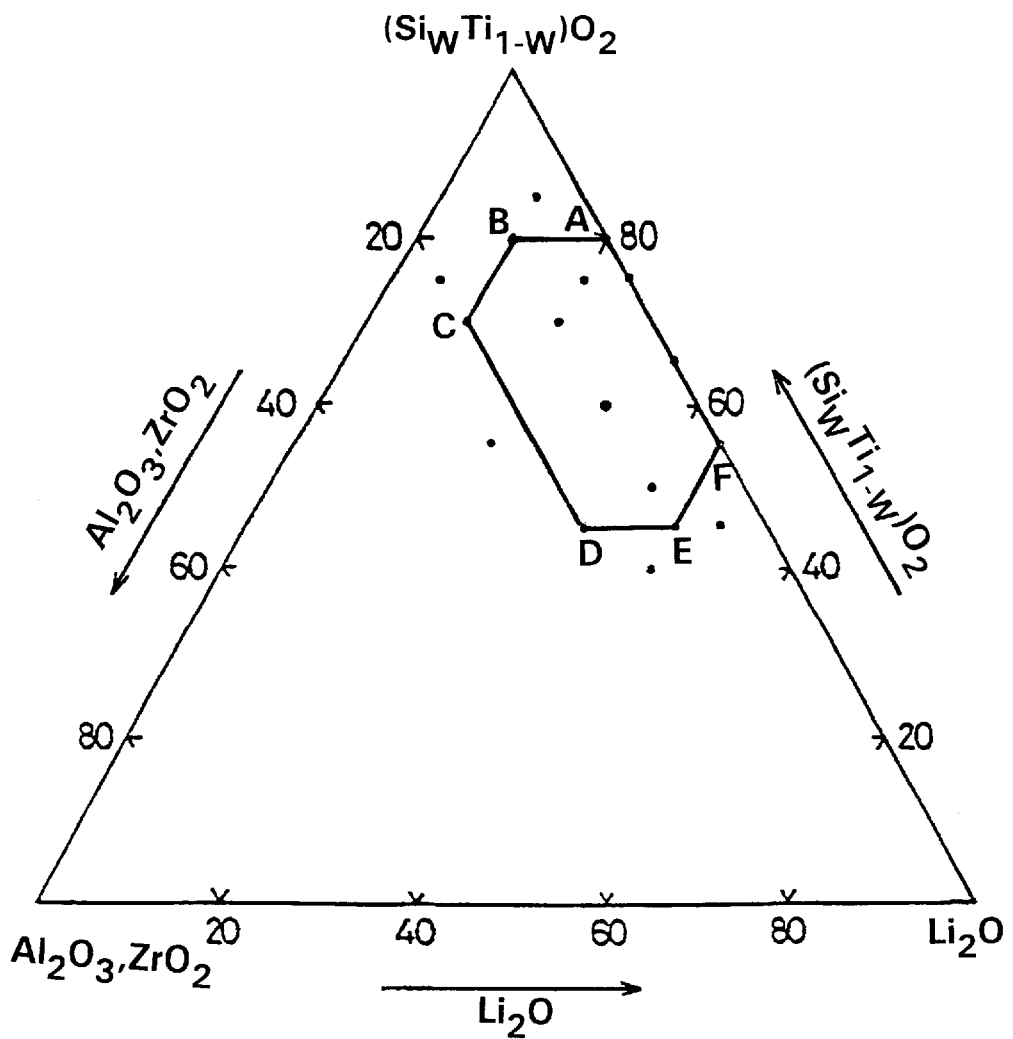
FIG. 4 is a ternary composition diagram of the $LiO_2$—$(Si_wTi_{w-w})O_2$—MO based oxide.
Figure 5:
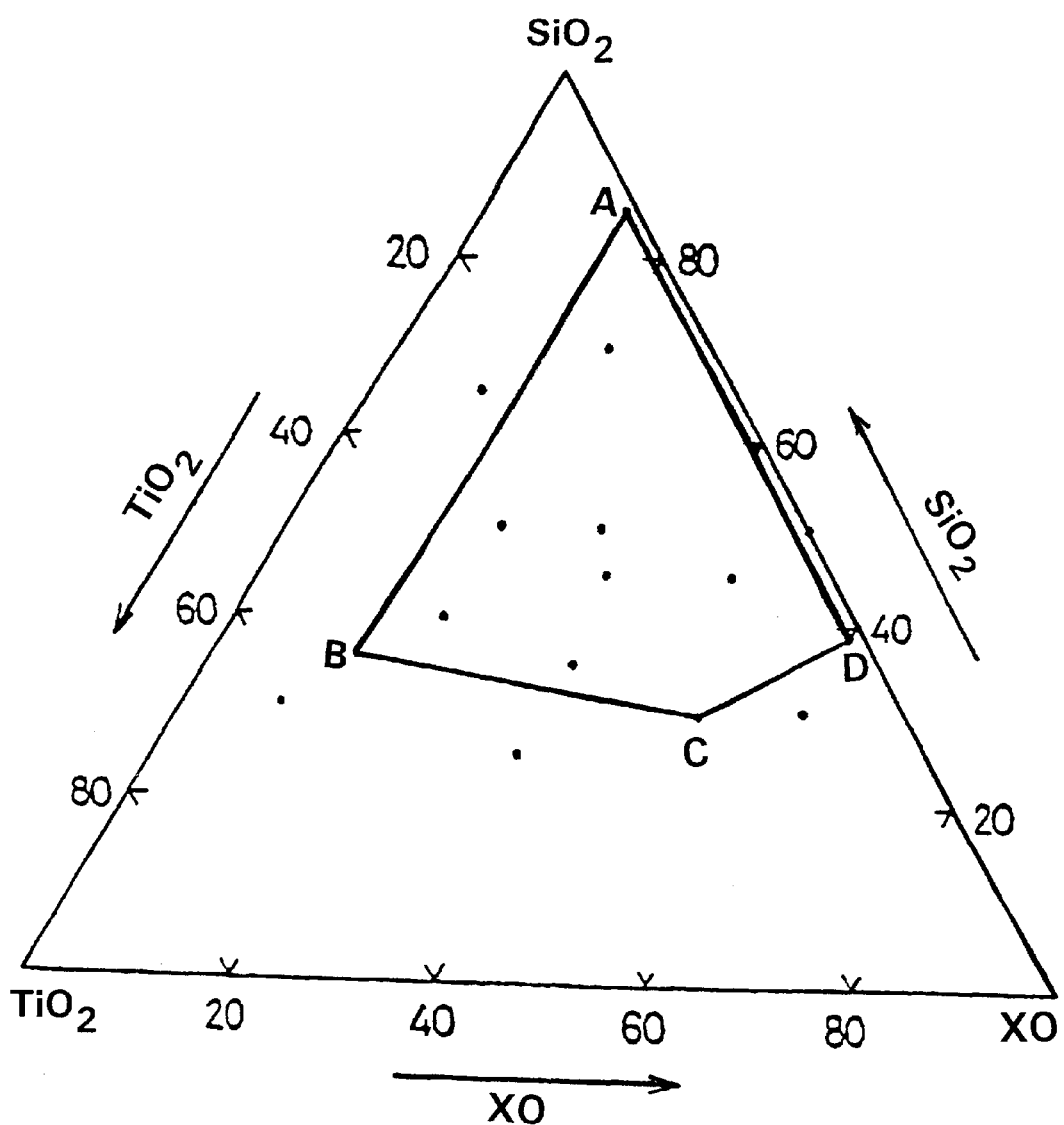
FIG. 5 is a ternary composition diagram of the $SiO_2$—$TiO_2$—XO based oxide.
Figure 6:
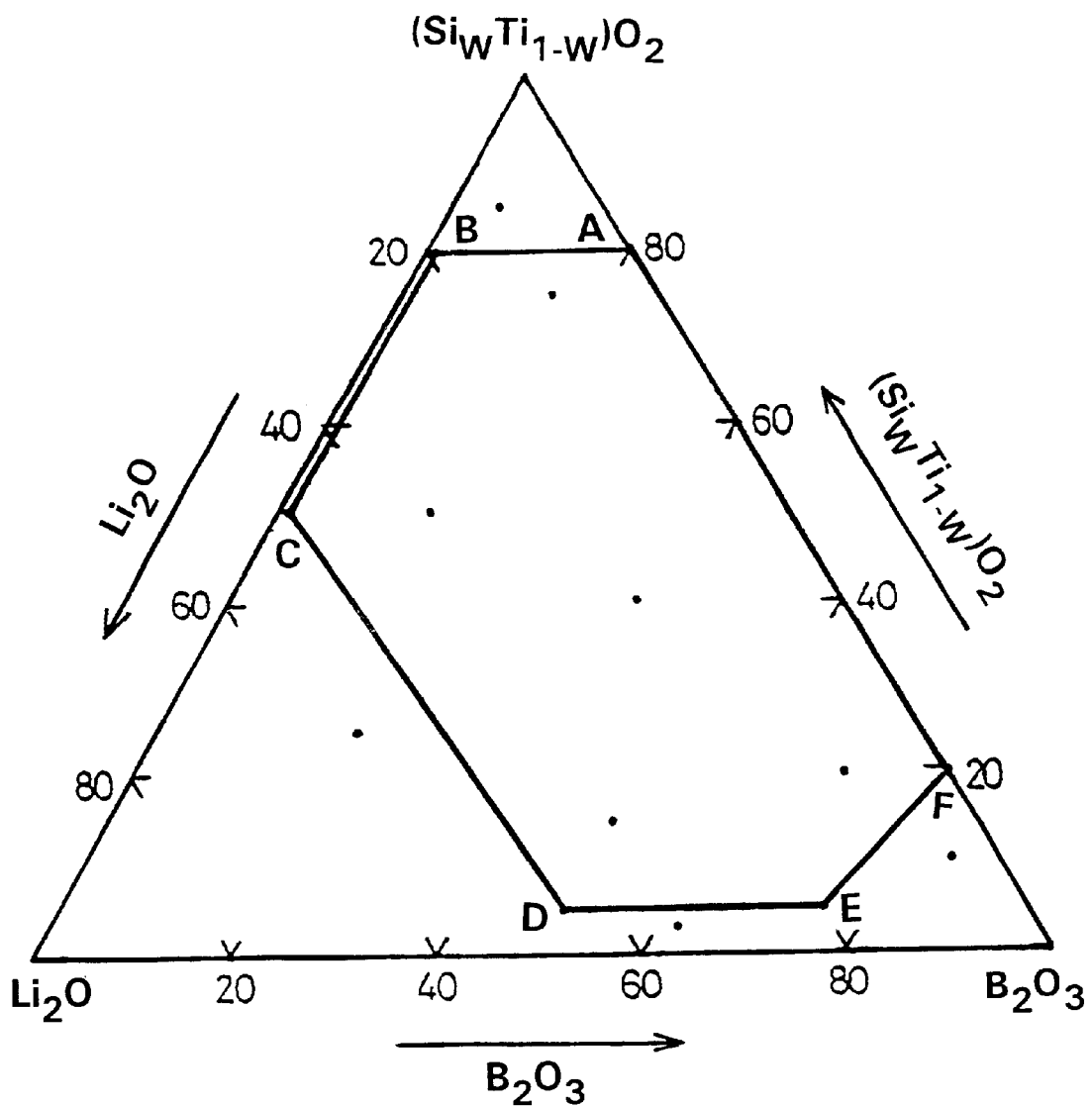
FIG. 6 is a ternary composition diagram of the $Li_2O$—$B_2O_3$—$(Si_wTi_{1-w})O_2$ based oxide.
Figure 7:
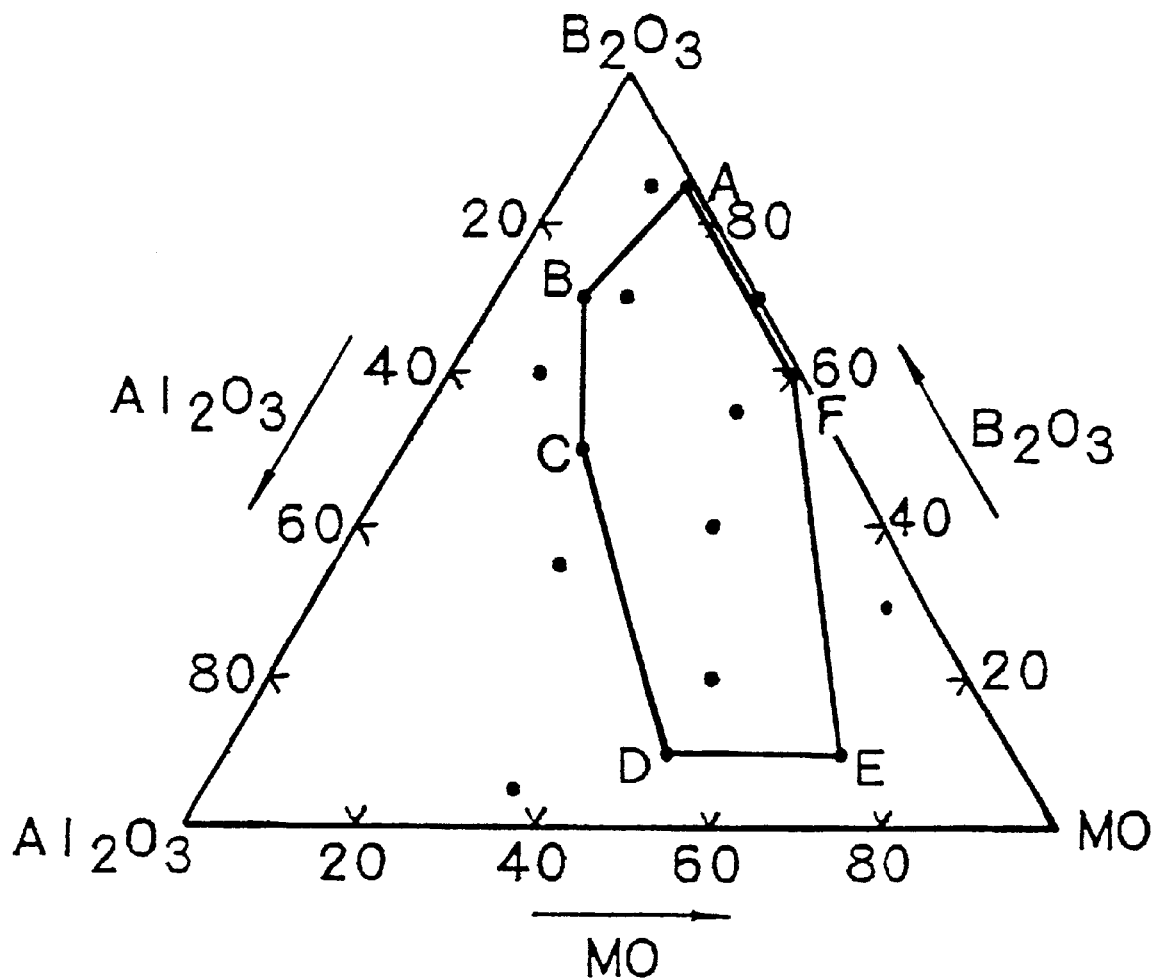
FIG. 7 is a ternary composition diagram of the $Al_2O_3$—MO—$B_2O_3$ based oxide.

Column 4, lines 1-2:

FIG. 4 is a ternary composition diagram of the [$LiO_2$—$(Si_wTi_{w-w}Ti_{1-w}))O_2$—MO ] $Li_2O$—$(Si_wTi_{1-w})O_2$—$MO$ based oxide.

Column 13, lines 20-44:

As are evident from Table 4 and Table 5, the sample Nos. 101 to 112, 118 and 120, in which [$Li_2O$—$(Si_wTi_{1-w})O_2$—Mo] $Li_2O$—$(Si_wTi_{1-w})O_2$—$MO$ based oxides with compositions within the area surrounded by the straight lines connecting between the succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0) (and where w is in the range of $0.3 \leq w < 1.0$ when the composition is on the line A-F) or on the lines in a ternary composition diagram having apexes represented by each component [$LiO_2$] $Li_2O$, $(Si_wTi_{1-w})O_2$ and MO (x, y and z are represented by mol % and w is in the range of $0.3 \leq w \leq 1.0$ when the component is on the line A-F,) are added, has a dielectric constant of as large as 1850, the rate of temperature dependent changes of the electrostatic capacitance satisfy the B-grade characteristic standard prescribed in the JIS standard in the temperature range from −25° C. to +85° C., and satisfy the X7R-grade characteristic standard prescribed in the EIA standard in the temperature range from −55° C. to +125° C. In addition, the rate of change of the capacitance when a DC voltage of 5 kV/mm is impressed is as small as within 43%, the change of the electrostatic capacitance being small when used as thin layers. The mean lifetime under the high temperature load test is as long as 80 hours or more, enabling a firing temperature of 1250° C.

Column 18, lines 9-19:

The outer electrodes are composed of a sintered layer comprising various conductive metals such as Ag, Pd, Ag—Pd, Cu and a Cu alloy, or a sintered layer produced by blending the conductive metal powder with [$B_2O_3$—$LiO_2$—$SiO_2$—BaO] $B_2O_3$—$Li_2O$—$SiO_2$—$BaO$ based, $B_2O_3$—$SiO_2$—BaO based, [$LiO_2$—$SiO_2$—BaO] $Li_2O$—$SiO_2$—$BaO$ based or $B_2O_3$—$SiO_2$-ZnO based glass frits. Plating layers can be formed on this sintered layer. The plating layer may be merely composed of the first plating layer 6 comprising Ni, Cu or a Ni—Cu alloy, or a second plating layer 7 with a solder or tin may be formed thereon.

Column 27, lines 10-23:

It is not preferable that the contents of the [first and second sub-components are] *third sub-component is* zero as in the samples No. 1112 and No. 1113 because the resistivity is lowered to immediately cause short circuit troubles when a voltage is impressed in the high temperature load test. It is also not preferable, on the other hand, that the contents of the [first and second subcomponents exceed] *third sub-component exceeds* about 5.0 parts by weight as in the sample No. 1114 because the second phase based on glass components is increased besides the temperature characteristics do not satisfy the B/X7R-grade characteristics and the mean lifetime is extremely shortened. Accordingly, the preferable content of [either] the [first] *third* component [or the second component] is in the range from about 0.2 to 5.0 parts by weight.

AS A RESULT OF REEXAMINATION, IT HAS BEEN DETERMINED THAT:

Claims 1-20 are cancelled.

New claims 21-30 are added and determined to be patentable.

*21. A dielectric ceramic according to claim 1, wherein the first sub-component is present and comprises $xLi_2O$—$y(Si_wTi_{1-w})O_2$—$zMO$, x, y and z are molar percentages, $0.30 \leq w \leq 1.0$, and x, y and z are within the area surrounded by straight lines connecting succeeding two points represented by A (x=20, y=80, z=0), B (x=10, y=80, z=10), C (x=10, y=70, z=20), D (x=35, y=45, z=20), E (x=45, y=45, z=10) and F (x=45, y=55, z=0), or on said lines, in a ternary composition diagram having apexes represented by the components $Li_2O$, $(Si_wTi_{1-w})O_2$ and MO, provided that when the first sub-component is on the line A-F, $0.3 \leq w < 1.0$.*

*22. A dielectric ceramic according to claim 21, wherein the first sub-component comprising at least one of $Al_2O_3$ and $ZrO_2$ in a combined amount of about 20 parts by weight or less and in which the $ZrO_2$ is 10 parts by weight or less relative to 100 parts by weight of the $Li_2O$—$(Si,Ti)O_2$—$MO$ oxide.*

*23. A dielectric ceramic according to claim 1, wherein the first sub-component is present and comprises $xLi_2O$—$y(Si_w$*

$Ti_{1-w})O_2$—$zMO$, $x$, $y$ and $z$ are molar percentages, $0.3 \leq w \leq 1.0$, and $x$, $y$, and $z$ are within the area surrounded by straight lines connecting succeeding two points represented by $A$ ($x=0$, $y=20$, $z=80$), $B$ ($x=19$, $y=1$, $z=80$), $C$ ($x=49$, $y=1$, $z=50$), $D$ ($x=45$, $y=50$, $z=5$), $E$ ($x=20$, $y=75$, $z=5$) and $F$ ($x=0$, $y=80$, $z=20$), or on said lines, in a ternary composition diagram having apexes represented by the components $Li_2O$, $(Si_w Ti_{1-w})O_2$ and $MO$ and wherein the $(Ba_{1-x}Ca_xO)_m TiO_2$ has a mean particle size of about 0.1 to 0.7 µm.

24. A dielectric ceramic according to claim 1, wherein the second sub-component is present and comprises $xSiO_2$—$yTiO_2$—$zXO$, $x$, $y$ and $z$ are molar percentages, and $x$, $y$ and $z$ are within the area surrounded by straight lines connecting between succeeding two points represented by $A$ ($x=85$, $y=1$, $z=14$), $B$ ($x=35$, $y=51$, $z=14$), $C$ ($x=30$, $y=20$, $z=50$) and $D$ ($x=39$, $y=1$, $z=60$), or on said lines, in a ternary composition diagram having apexes represented by the components $SiO_2$, $TiO_2$ and $XO$.

25. A dielectric ceramic according to claim 6, wherein the second sub-component comprising at least one of $Al_2O_3$ and $ZrO_2$ in a combined amount of about 15 parts by weight or less and the $ZrO_2$ is 5 parts by weight or less relative to 100 parts by weight of the $SiO_2$—$TiO_2$—$XO$ oxide.

26. A dielectric ceramic according to claim 1, wherein the second sub-component is present and comprises $xSiO_2$—$yTiO_2$—$zXO$, and $x$, and $z$ are within the area surrounded by straight lines connecting succeeding two points represented by $A$ ($x=1$, $y=14$, $z=85$), $B$ ($x=20$, $y=10$, $z=70$), $C$ ($x=30$, $y=20$, $z=50$), $D$ ($x=40$, $y=50$, $z=10$), $E$ ($x=20$, $y=70$, $z=10$) and $F$ ($x=1$, $y=39$, $z=60$), or on said lines, in a ternary composition diagram having apexes represented by the components $SiO_2$, $TiO_2$ and $XO$ and wherein the $(Ba_{1-x}Ca_xO)_m TiO_2$ has a mean particle size of about 0.1 to 0.7 µm.

27. A laminated ceramic capacitor having:
   a plurality of dielectric layers containing the dielectric ceramic according to claim 21;
   a plurality of inner electrode layers comprising Ni or a Ni alloy and existing among a plurality of said dielectric layers; and
   external electrodes in electrical continuity to a plurality of said inner electrode layers and being on the surface of said ceramic capacitor.

28. A laminated ceramic capacitor according to claim 27, wherein said external electrodes comprise a sintered layer of conductive metal powder or conductive metal powder and glass frit.

29. A laminated ceramic capacitor having:
   a plurality of dielectric layers containing the dielectric ceramic according to claim 24;
   a plurality of inner electrode layers comprising Ni or a Ni alloy and existing among a plurality of said dielectric layers; and
   external electrodes in electrical continuity to a plurality of said inner electrode layers and being on the surface of said ceramic capacitor.

30. A laminated ceramic capacitor according to claim 29, wherein said external electrodes comprise a sintered layer of conductive metal powder or conductive metal powder and glass frit.

* * * * *